(12) United States Patent
Miles

(10) Patent No.: US 7,355,782 B2
(45) Date of Patent: Apr. 8, 2008

(54) SYSTEMS AND METHODS OF CONTROLLING MICRO-ELECTROMECHANICAL DEVICES

(75) Inventor: Mark W. Miles, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 0 days.

(21) Appl. No.: 11/564,800

(22) Filed: Nov. 29, 2006

(65) Prior Publication Data

US 2007/0146376 A1    Jun. 28, 2007

Related U.S. Application Data

(63) Continuation of application No. 11/438,913, filed on May 23, 2006, which is a continuation of application No. 09/413,222, filed on Oct. 5, 1999, now Pat. No. 7,123,216.

(51) Int. Cl.
*G02B 26/00* (2006.01)
*G09G 3/34* (2006.01)
*H01L 29/84* (2006.01)
*H03K 17/16* (2006.01)

(52) U.S. Cl. .................. 359/291; 359/290; 345/31; 345/85; 345/212; 257/414; 327/108; 327/382; 73/514.32; 73/514.18

(58) Field of Classification Search ........ 359/290–292, 359/237, 238, 260, 298; 345/31, 85, 212, 345/540; 327/108, 309, 381, 382; 73/514.16, 73/514.18, 514.32; 257/22, 38, 414; 330/168, 330/277, 302; 349/1; 385/147; 324/76.11, 324/761; 361/139; 200/181; 326/38, 101

See application file for complete search history.

(56) References Cited

U.S. PATENT DOCUMENTS 3,656,836 A    4/1972  de Cremoux et al.

(Continued)

FOREIGN PATENT DOCUMENTS

EP    0 035 299    9/1983

(Continued)

OTHER PUBLICATIONS

Aratani, K., et al. "Process and Design Considerations for Surface Micromachined Beams for a Tuneable Interferometer Array in Silicon," IEEE MicroElectro Mechanical Systems: An Investigation of Micro Structures, Sensors, Actuators, Machines and Systems: proceedings, 1993, pp. 230-235.

(Continued)

*Primary Examiner*—Loha Ben
(74) *Attorney, Agent, or Firm*—Knobbe Martens Olson & Bear LLP

(57) ABSTRACT

An interference modulator (Imod) incorporates anti-reflection coatings and/or micro-fabricated supplemental lighting sources. An efficient drive scheme is provided for matrix addressed arrays of IMods or other micromechanical devices. An improved color scheme provides greater flexibility. Electronic hardware can be field reconfigured to accommodate different display formats and/or application functions. An IMod's electromechanical behavior can be decoupled from its optical behavior. An improved actuation means is provided, some one of which may be hidden from view. An IMod or IMod array is fabricated and used in conjunction with a MEMS switch or switch array. An IMod can be used for optical switching and modulation. Some IMods incorporate 2-D and 3-D photonic structures. A variety of applications for the modulation of light are discussed. A MEMS manufacturing and packaging approach is provided based on a continuous web fed process. IMods can be used as test structures for the evaluation of residual stress in deposited materials.

13 Claims, 22 Drawing Sheets

U.S. PATENT DOCUMENTS

| | | |
|---|---|---|
| 3,725,868 A | 4/1973 | Malmer, Jr. et al. |
| 3,955,880 A | 5/1976 | Lierke |
| 4,196,396 A | 4/1980 | Smith |
| 4,377,324 A | 3/1983 | Durand et al. |
| 4,403,248 A | 9/1983 | Te Velde |
| 4,441,791 A | 4/1984 | Hornbeck |
| 4,459,182 A | 7/1984 | te Velde |
| 4,482,213 A | 11/1984 | Piliavin et al. |
| 4,519,676 A | 5/1985 | te Velde |
| 4,786,128 A | 11/1988 | Birnbach |
| 4,790,635 A | 12/1988 | Apsley |
| 4,859,060 A | 8/1989 | Katagiri et al. |
| 4,900,136 A | 2/1990 | Goldburt et al. |
| 4,965,562 A | 10/1990 | Verhulst |
| 5,022,745 A | 6/1991 | Zayhowski et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,099,353 A | 3/1992 | Hornbeck |
| 5,124,834 A | 6/1992 | Cusano et al. |
| 5,142,405 A | 8/1992 | Hornbeck |
| 5,168,406 A | 12/1992 | Nelson |
| 5,172,262 A | 12/1992 | Hornbeck |
| 5,192,395 A | 3/1993 | Boysel et al. |
| 5,212,582 A | 5/1993 | Nelson |
| 5,218,472 A | 6/1993 | Jozefowicz et al. |
| 5,226,099 A | 7/1993 | Mignardi et al. |
| 5,231,532 A | 7/1993 | Magel et al. |
| 5,233,459 A | 8/1993 | Bozler et al. |
| 5,287,215 A | 2/1994 | Warde et al. |
| 5,293,272 A | 3/1994 | Jannson et al. |
| 5,311,360 A | 5/1994 | Bloom et al. |
| 5,345,328 A | 9/1994 | Fritz et al. |
| 5,347,377 A | 9/1994 | Revelli, Jr. et al. |
| 5,381,232 A | 1/1995 | van Wijk |
| 5,474,865 A | 12/1995 | Vasudev |
| 5,488,505 A | 1/1996 | Engle |
| 5,489,952 A | 2/1996 | Gove et al. |
| 5,500,761 A | 3/1996 | Goossen et al. |
| 5,526,688 A | 6/1996 | Boysel et al. |
| 5,535,047 A | 7/1996 | Hornbeck |
| 5,552,924 A | 9/1996 | Tregilgas |
| 5,559,358 A | 9/1996 | Burns et al. |
| 5,569,565 A | 10/1996 | Kawakami et al. |
| 5,578,976 A | 11/1996 | Yao |
| 5,597,736 A | 1/1997 | Sampsell |
| 5,602,671 A | 2/1997 | Hornbeck |
| 5,608,468 A | 3/1997 | Gove et al. |
| 5,619,059 A | 4/1997 | Li et al. |
| 5,619,365 A | 4/1997 | Rhoades et al. |
| 5,619,366 A | 4/1997 | Rhoads et al. |
| 5,629,790 A | 5/1997 | Neukermans et al. |
| 5,633,652 A | 5/1997 | Kanbe et al. |
| 5,638,946 A | 6/1997 | Zavracky |
| 5,665,997 A | 9/1997 | Weaver et al. |
| 5,674,757 A | 10/1997 | Kim |
| 5,710,656 A | 1/1998 | Goosen |
| 5,737,050 A | 4/1998 | Takahara et al. |
| 5,739,945 A | 4/1998 | Tayebati |
| 5,745,281 A | 4/1998 | Yi et al. |
| 5,771,321 A | 6/1998 | Stern |
| 5,784,189 A | 7/1998 | Bozler et al. |
| 5,818,095 A | 10/1998 | Sampsell |
| 5,822,110 A * | 10/1998 | Dabbaj ................... 359/293 |
| 5,822,170 A | 10/1998 | Cabuz et al. |
| 5,824,608 A | 10/1998 | Gotoh et al. |
| 5,825,528 A | 10/1998 | Goosen |
| 5,867,302 A * | 2/1999 | Fleming ................... 359/291 |
| 5,896,796 A | 4/1999 | Chih |
| 5,926,309 A * | 7/1999 | Little ................... 359/293 |
| 5,943,155 A | 8/1999 | Goossen |
| 5,943,158 A | 8/1999 | Ford et al. |
| 5,959,763 A | 9/1999 | Bozler et al. |
| 5,972,193 A | 10/1999 | Chou et al. |
| 5,976,902 A | 11/1999 | Shih |
| 5,978,127 A | 11/1999 | Berg |
| 6,028,690 A | 2/2000 | Carter et al. |
| 6,031,653 A | 2/2000 | Yu |
| 6,040,937 A | 3/2000 | Miles |
| 6,046,840 A | 4/2000 | Huibers |
| 6,055,090 A | 4/2000 | Miles et al. |
| 6,072,686 A | 6/2000 | Yarbrough |
| 6,099,132 A | 8/2000 | Kaeriyama |
| 6,149,190 A * | 11/2000 | Galvin et al. ............ 280/735 |
| 6,160,833 A | 12/2000 | Floyd et al. |
| 6,170,332 B1 * | 1/2001 | MacDonald et al. ..... 73/514.38 |
| 6,194,323 B1 | 2/2001 | Downey et al. |
| 6,201,633 B1 | 3/2001 | Peeters et al. |
| 6,249,039 B1 | 6/2001 | Harvey et al. |
| 6,282,010 B1 | 8/2001 | Sulzbach et al. |
| 6,295,154 B1 | 9/2001 | Laor et al. |
| 6,320,394 B1 * | 11/2001 | Tartagni ................... 324/671 |
| 6,323,982 B1 | 11/2001 | Hornbeck |
| 6,333,556 B1 | 12/2001 | Juengling et al. |
| 6,391,675 B1 | 5/2002 | Ehmke et al. |
| 6,437,583 B1 * | 8/2002 | Tartagni et al. ............. 324/687 |
| 6,447,126 B1 | 9/2002 | Hornbeck |
| 6,537,427 B1 | 3/2003 | Raina |
| 6,624,944 B1 | 9/2003 | Wallace et al. |
| 6,674,562 B1 | 1/2004 | Miles |
| 6,970,031 B1 | 11/2005 | Martin et al. |
| 7,123,216 B1 | 10/2006 | Miles |
| 2001/0003487 A1 | 6/2001 | Miles |
| 2005/0264340 A1 | 12/2005 | Martin et al. |
| 2006/0066935 A1 | 3/2006 | Cummings et al. |

FOREIGN PATENT DOCUMENTS

| | | |
|---|---|---|
| EP | 0 667 548 | 8/1995 |
| EP | 1 197 778 | 4/2002 |
| EP | 1 243 550 | 9/2002 |
| EP | 1 452 481 | 9/2004 |
| JP | 10-116996 | 5/1998 |
| JP | 11-243214 | 9/1999 |
| JP | 11-263012 | 9/1999 |

OTHER PUBLICATIONS

Aratani K. et al. "Surface Micromachined Tuneable Interferometer Array," Sensors and Actuators A, Elsevier Sequoia S.A., Lausanne, CH, vol. A43, No. 1/3, May 1, 1994, pp. 17-23.
Goossen et al., "Possible Display Applications of the Silicon Mechanical Anti-Reflection Switch," Society for Information Display (1994).
Magel, "Integrated Optic Devices Using Micromachined Metal Membranes," SPIE vol. 2686, 0-8194-2060-Mar. (1996).
Office Action mailed Nov. 29, 2005 in U.S. Appl. No. 11/150,682.
Office Action mailed Apr. 18, 2006 in U.S. Appl. No. 11/150,682.
Office Action mailed Oct. 31, 2006 in U.S. Appl. No. 11/150,682.
Office Action mailed Apr. 20, 2007 in U.S. Appl. No. 11/150,682.
Office Action mailed Feb. 28, 2006 in U.S. Appl. No. 11/255,347.
Office Action mailed Sep. 11, 2006 in U.S. Appl. No. 11/255,347.
Office Action mailed Jul. 3, 2002 in U.S. Appl. No. 10/012,092.
Office Action mailed Aug. 27, 2003 in U.S. Appl. No. 10/224,029.
Office Action mailed Feb. 10, 2004 in U.S. Appl. No. 10/224,029.
Office Action mailed Jul. 14, 2004 in U.S. Appl. No. 10/224,029.
Office Action mailed Mar. 24, 2005 in U.S. Appl. No. 10/224,029.
Office Action mailed Aug. 9, 2007 in U.S. Appl. No. 11/390,996.
Offic Action received Mar. 13, 2006 in R.O.C. App. No. 91105559.
Office Action received Jun. 8, 2005 in R.O.C. App. No. 91105559.
IPER for PCT/US01/41341 filed Jul. 10, 2001.
ISR for PCT/US01/41341 filed Jul. 10, 2001.
WO for PCT/US01/41341 filed Jul. 10, 2001.

French, P.J. "Development of Surface Micromachining techniques compatible with on-chip electronics" Journal of Micromechanics and Microengineering vol. 6 No. 2, 197-211 XP 002360789 Jun. (1996) IOP Publishing.

Furneaux, et al. "The Formation of Controlled-porosity membranes from Anodically Oxidized Aluminum" Nature v. 337 Jan. 12, 1989, pp. 147-149.

Joannopoulos et al., "Photonic Crystals: Molding the Flow of Light," Princeton University Press (1995).

Kim et al., "Control of Optical Transmission Through Metals Perforated With Subwavelength Hole Arrays," Optic Letters, vol. 24, No. 4, pp. 256-257, (Feb. 1999).

* cited by examiner

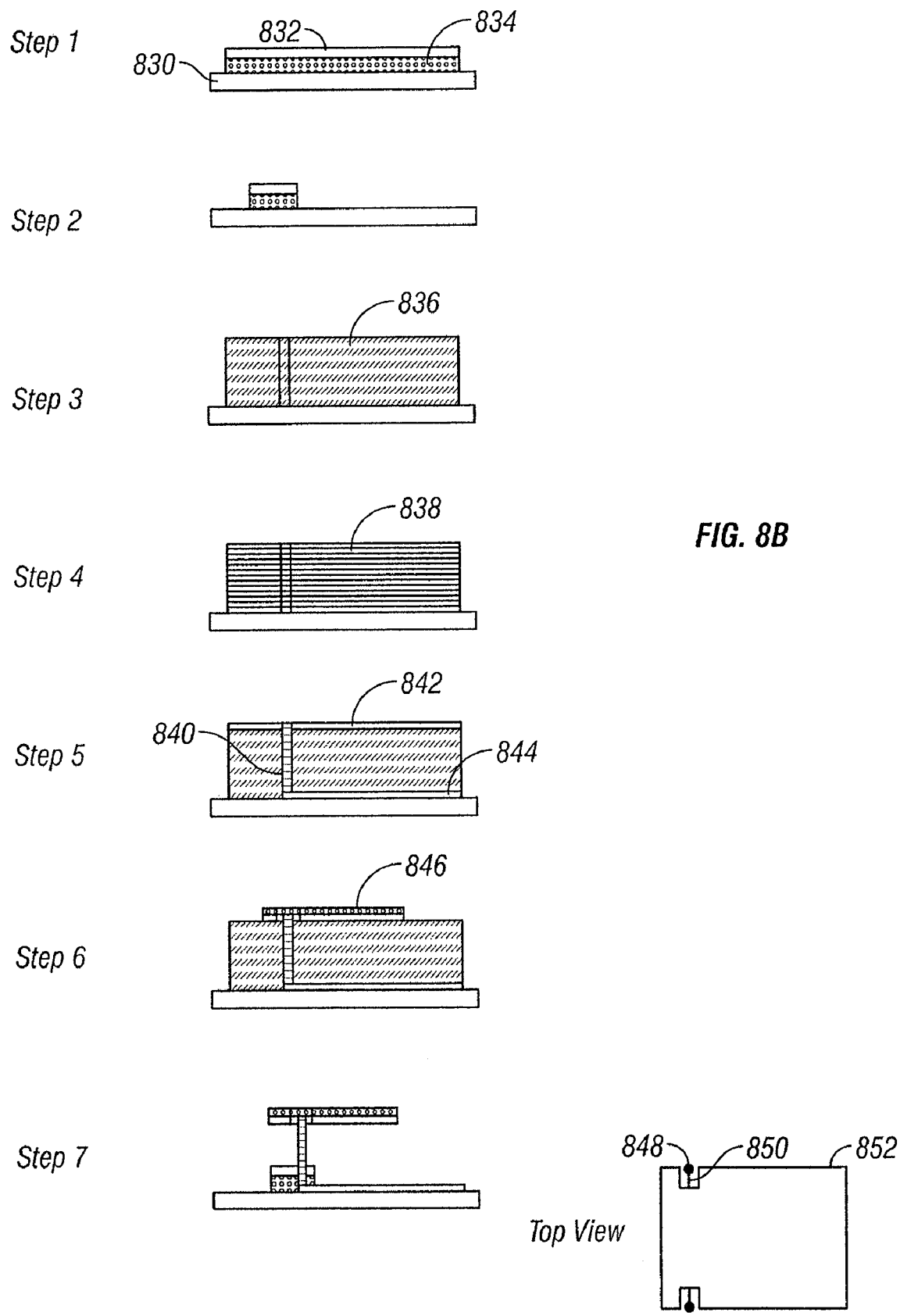

SIDE VIEW    BOTTOM VIEW
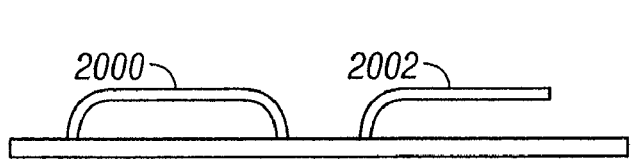 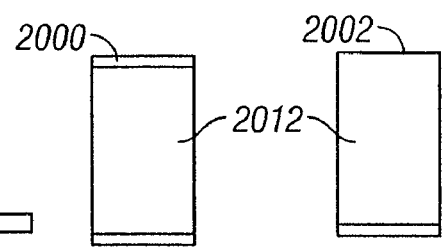
FIG. 20A         FIG. 20B
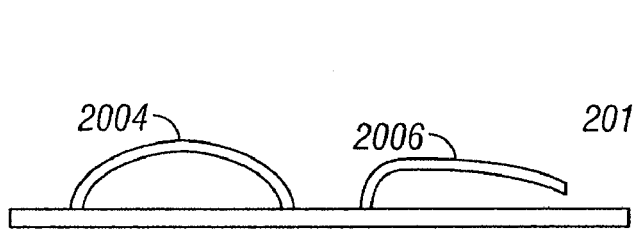 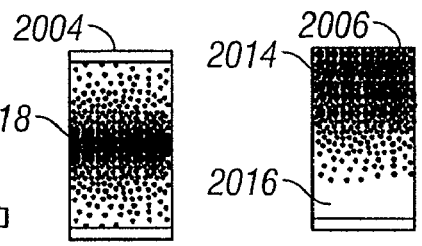
FIG. 20C         FIG. 20D
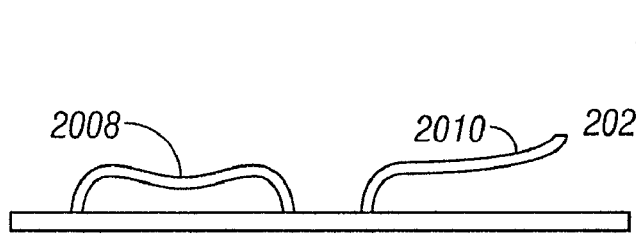 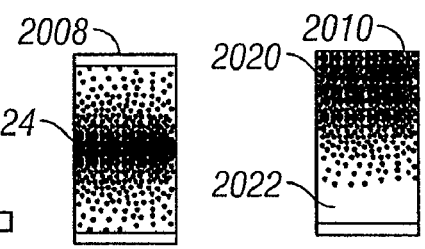
FIG. 20E         FIG. 20F
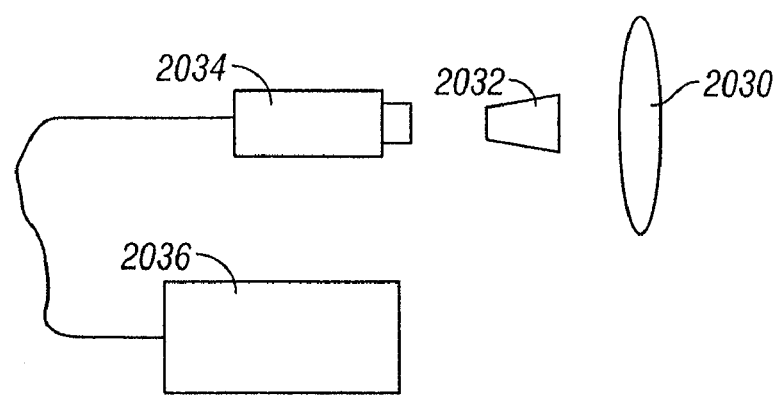
FIG. 20G

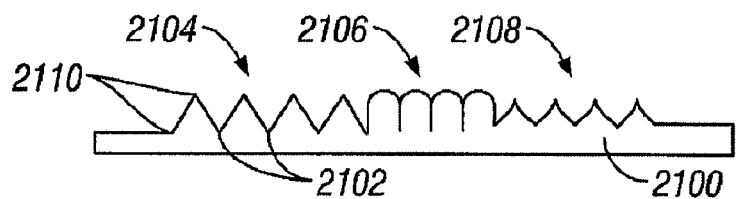
FIG. 21A
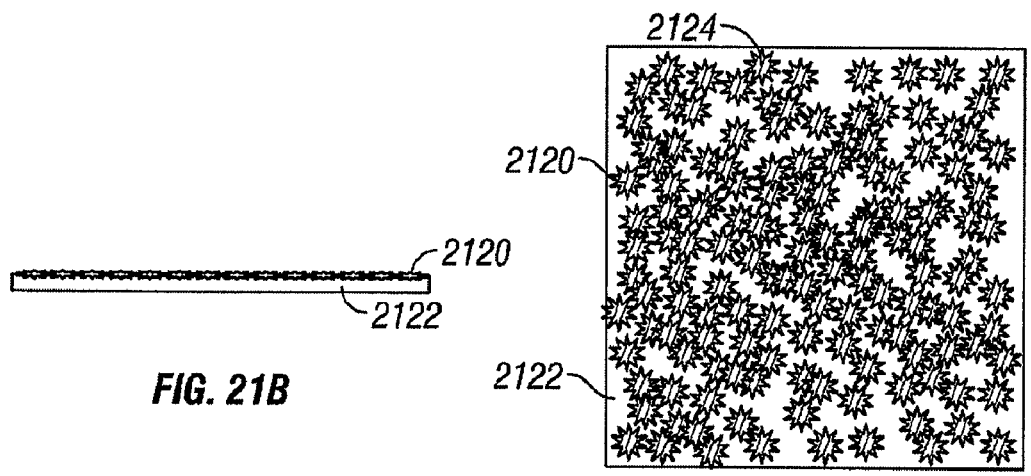
FIG. 21B
FIG. 21C
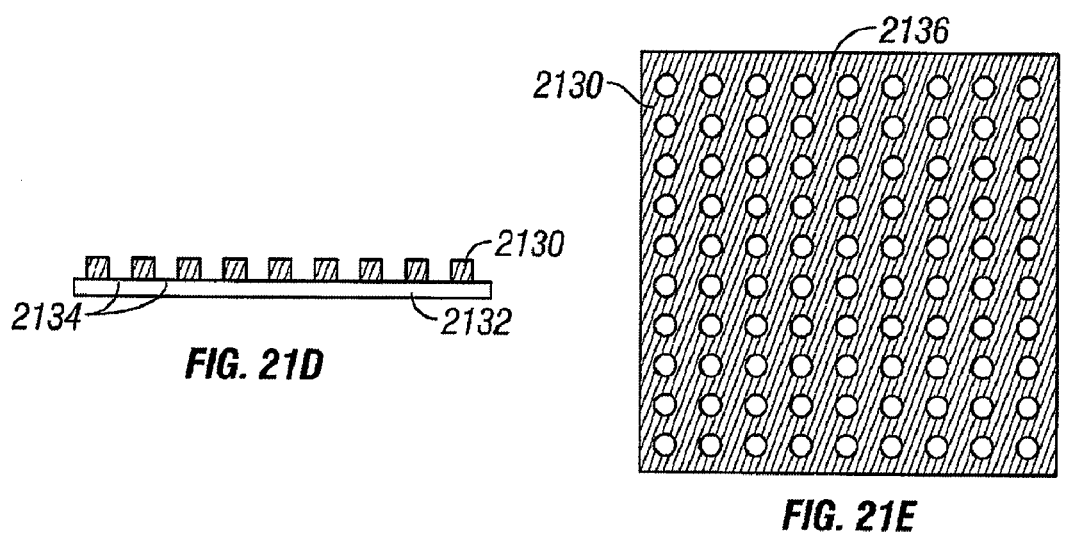
FIG. 21D
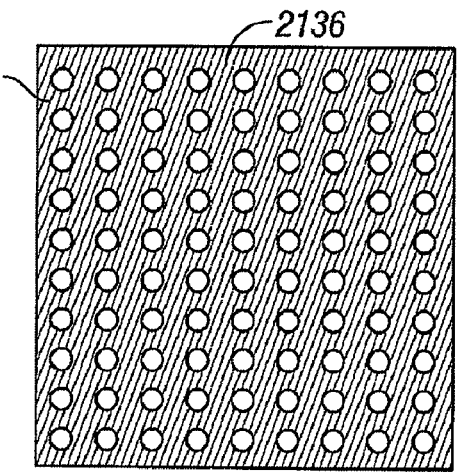
FIG. 21E

SYSTEMS AND METHODS OF CONTROLLING MICRO-ELECTROMECHANICAL DEVICES

CROSS REFERENCE TO RELATED APPLICATIONS

This application is a continuation of co-pending U.S. application Ser. No. 11/438,913, filed May 23, 2006, which is a continuation of U.S. application Ser. No. 09/413,222, filed Oct. 5, 1999 (now U.S. Pat. No. 7,123,216).

The disclosures of all the above-referenced prior applications, publications, and patents are considered part of the disclosure of this application, and are incorporated by reference herein. The disclosures of U.S. application Ser. Nos. 08/554,630, (now abandoned), 08/688,710 (now U.S. Pat. No. 6,040,937), 08/744,253 (now U.S. Pat. No. 5,986,796), 08/769,947 (now abandoned) and 09/056,975 (now U.S. Pat. No. 6,674,562) filed on Nov. 6, 1995, Jul. 31, 1996, Nov. 5, 1996, Dec. 19, 1996, and Apr. 8, 1998, respectively, are hereby incorporated by reference.

BACKGROUND

1. Field

This invention relates to interferometric modulation.

2. Description of the Related Technology

Interferometric modulators (IMods) modulate incident light by the manipulation of the optical properties of a micromechanical device. This is accomplished by altering the device's interferometric characteristics using a variety of techniques. IMods lend themselves to a number of applications ranging from flat panels displays and optical computing to fiber-optic modulators and projection displays. The different applications can be addressed using different IMod designs.

SUMMARY

In general, in one aspect, the invention features an IMod based display that incorporates anti-reflection coatings and/or micro-fabricated supplemental lighting sources.

In general, in one aspect, the invention features an efficient drive scheme for matrix addressed arrays of IMods or other micromechanical devices.

In general, in one aspect, the invention features a color scheme that provides a greater flexibility.

In general, in one aspect, the invention features electronic hardware that can be field reconfigured to accommodate different display formats and/or application functions.

In general, in one aspect, the invention features an IMod design that decouples the IMod's electromechanical behavior from the IMod's optical behavior.

In general, in one aspect, the invention features an IMod design with alternative actuation means, some one of which may be hidden from view.

In general, in one aspect, the invention features an IMod or IMod array that is fabricated and used in conjunction with a MEMS switch or switch array, and/or MEMS based logic.

In general, in one aspect, the invention features an IMod that can be used for optical switching and modulation.

In general, in one aspect, the invention features IMods that incorporate 2-D and 3-D photonic structures.

In general, in one aspect, the invention features a variety of applications for the modulation of light.

In general, in one aspect, the invention features a MEMS manufacturing and packaging approach based on a continuous web fed process.

In general, in one aspect, the invention features IMods used as test structures for the evaluation of residual stress in deposited films.

BRIEF DESCRIPTION OF THE DRAWINGS

FIG. 8B reveals the fabrication sequence of the rotational IMod design.

FIGS. 20A-20G illustrate how IMod based test structures may be used as tools for stress measurement.

FIGS. 21A-21E illustrate various types of discontinuous films which can be used in an IMod structure.

DETAILED DESCRIPTION

Anti-reflective Coating

An attribute of one previously described IMod design (the induced absorber design described in U.S. patent application Ser. No. 08/554,630, filed on Nov. 6, 1995, and incorporated by reference) is the efficiency of its dark state, in which it can absorb as much as 99.7% of light which is incident upon it. This is useful in reflective displays. In the described design, the IMod reflects light of a certain color in the un-actuated state, and absorbs light in the actuated state.

Because the IMod array resides on a substrate, the potential for absorption is diminished by the inherent reflection of the substrate. In the case of a glass substrate, the amount of reflection is generally about 4% across the visible spectrum. Thus, despite the absorptive capability of the IMod structure, a dark state can only be as dark as the front surface reflection from the substrate will permit.

One way to improve the overall performance of an IMod based display is by the incorporation of anti-reflection coatings (AR coatings). These coatings can comprise one or more layers of dielectric films deposited on the surface of a substrate and are designed to reduce the reflection from that surface. There are many different possible configurations for such films and design and fabrication is a well known art. One simple film design is a single coating of magnesium fluoride approximately one-quarter wave thick. Another example utilizes a quarter wave film of lead fluoride deposited on the glass, followed by a quarter wave film of magnesium fluoride, with yet a third example interposing a film of zinc sulfide between the two.

Figure 1A:
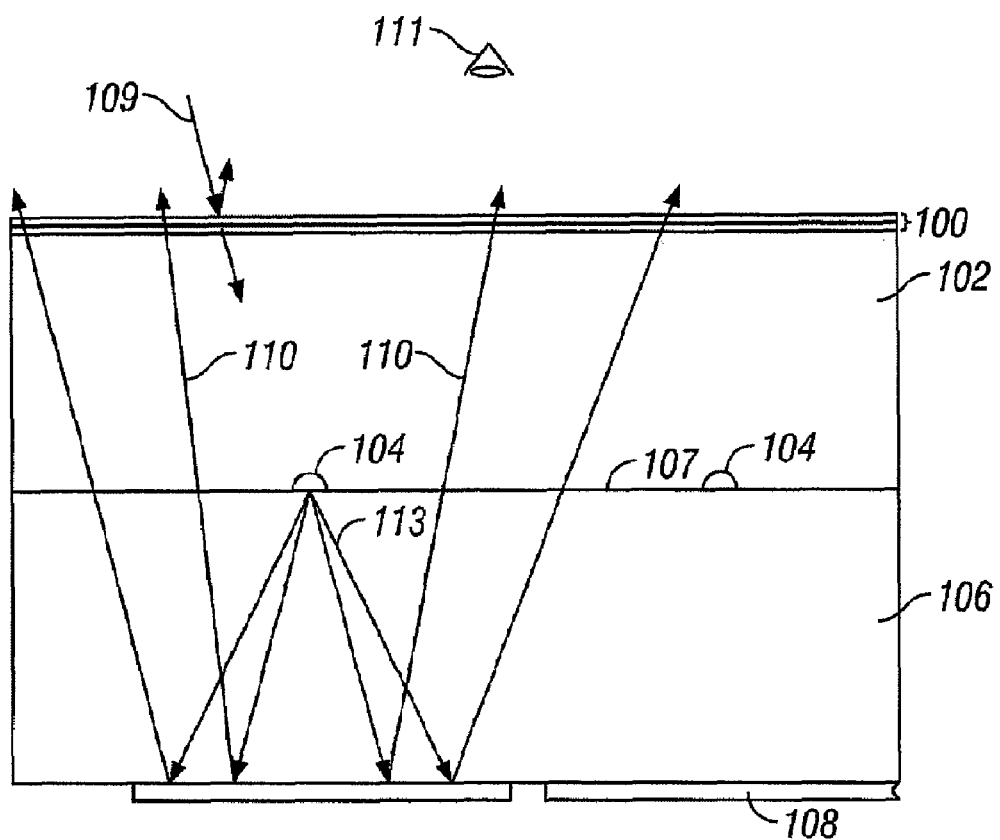
FIG. 1A is a cross-section of a display substrate incorporating an anti-reflection coating and integrated supplemental lighting.

FIG. 1A illustrates one way in which an AR coating may be incorporated into an IMod display to improve the performance of the display system. In FIG. 1A, AR coating 100, which, as stated, could comprise one or more thin films, is deposited on the surface of glass layer 102 bonded to glass substrate 106, on the opposite side of which is fabricated IMod array 108. The presence of AR coating 100 reduces the amount of incident light 109 reflected from the surface by coupling more of it into the glass layer 102. The result is that more of the incident light is acted upon by the IMod array and a darker display state can be obtained when the IMod is operating in the absorptive mode. The AR coating 100 could also be deposited directly on the surface of glass substrate 106 on the side opposite that of the IMod array.

Integrated Lighting

FIG. 1A also shows how supplemental lighting may be supplied to such a display. In this case an array of microscopic arc lamps, 104, is fabricated into glass layer 102. Arc lamps are efficient suppliers of light. Historically, arc lamps have been fabricated using techniques relevant to the fabrication of ordinary light bulbs. A typical version of such a lamp is described in U.S. Pat. No. 4,987,496. A glass vessel is built, and electrodes, fabricated separately, are enclosed in the vessel. After filling with an appropriate gas, the vessel is sealed. Although such bulbs may be made small, their method of manufacture may not be suited to the fabrication of large monolithic arrays of such bulbs.

Techniques used in the manufacture of micro mechanical structures may be applied to the fabrication of microscopic discharge or arc lamps. Because of the microscopic size of these "micro-lamps", the voltages and currents to drive them are significantly lower than those required to supply arc lamps fabricated using conventional means and sizes. In the example of FIG. 1A, the array is fabricated such that light 113 emitted by the lamps is directed towards the IMod array 108 by an inherent reflector layer, which is described below.

Figure 2:
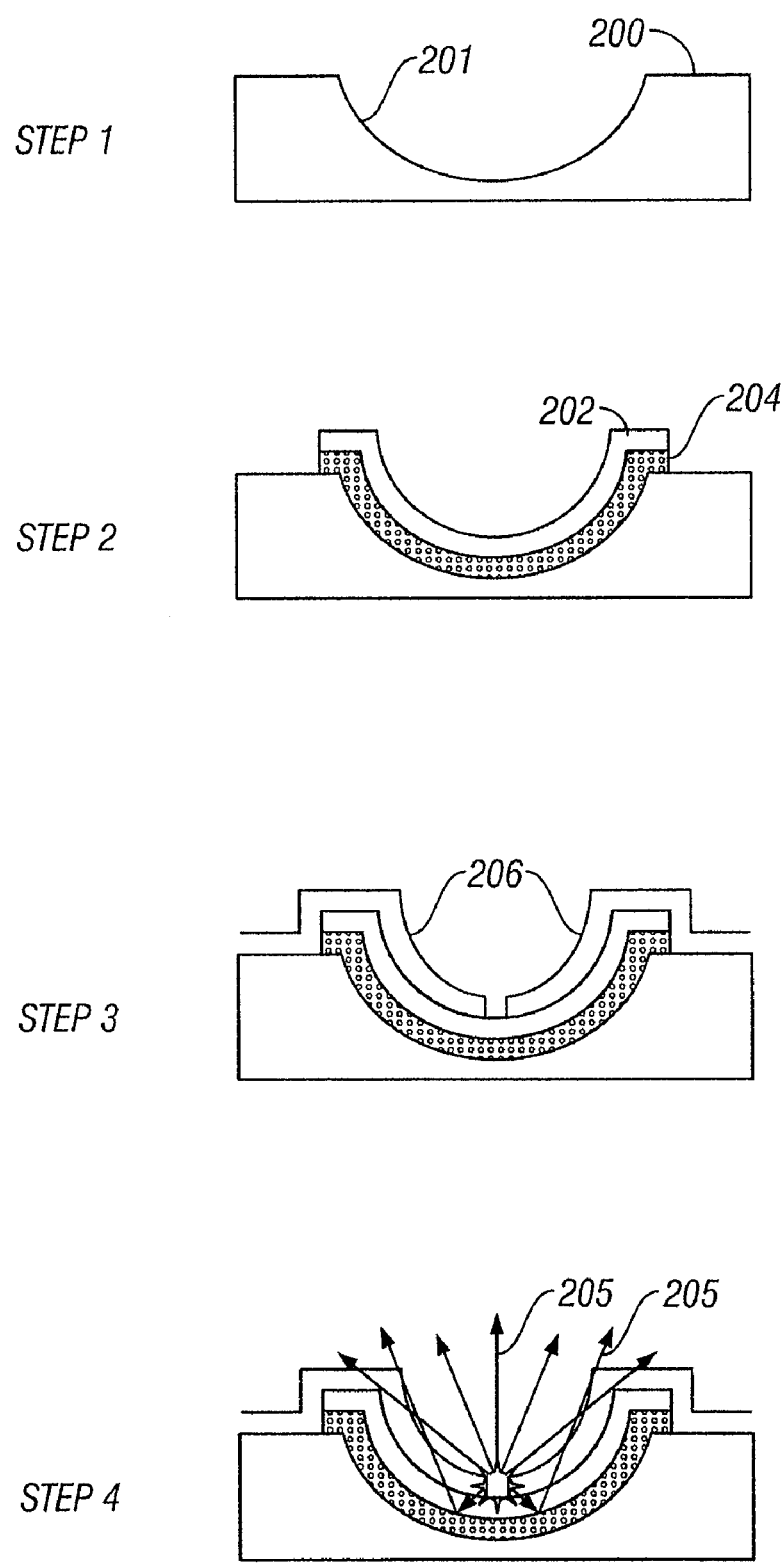
FIG. 2 shows detail of the fabrication process of a micromachined arc lamp source.

FIG. 2 provides detail on how one such lamp, optimized for a flat panel display, could be fabricated. The sequence is described as follows. As seen in step 1, glass layer 200 is etched to form a reflector bowl 201 using wet or dry chemical etching. The depth and shape of the bowl are determined by the required area of illumination for each lamp. A shallow bowl would produce a broad reflected beam spread while a parabola would tend to collimate the reflected light. The diameter of the bowl could vary from 10 to several hundred microns. This dimension is determined by the amount of display area that can be acceptably obscured from the viewer's perspective. It is also a function of the density of the array of micro-lamps. Using standard deposition techniques, e.g., sputtering, and standard photolithographic techniques, a reflector/metal halide layer 204 and sacrificial layer 202 are deposited and patterned. The reflector/metal halide layer could be a film stack comprising aluminum (the reflector) and metal halides such as thallium iodide, potassium iodide, and indium iodide. The metal halide, while not essential, can enhance the properties of the light that is generated. The sacrificial layer could be a layer such as silicon, for example.

Next, electrode layer 206 is deposited and patterned to form two separate electrodes. This material could be a refractory metal like tungsten and would have a thickness that is sufficient to provide mechanical support, on the order of several thousand angstroms. Then sacrificial layer 202 is removed using a dry release technique. The assembly (in the form of an array of such lamps) is sealed by bonding to a glass plate like substrate 106 (shown in FIG. 1A) such that the reflector faces the plate. A gas, such as xenon, is used to backfill the cavities, formed by the lamps during the sealing process, to a pressure of approximately one atmosphere. This could be accomplished by performing the sealing process in an airtight chamber that has been previously filled with Xenon.

The application of sufficient voltage to the electrodes of each lamp will result in an electrical discharge, in the gas between the ends of the electrodes, and the emission of light 205 in a direction away from the reflector 204. This voltage could be as low as several tens of volts if the gap spacing is on the order of several hundred microns or less. If the electrode material is deposited with minimal stress, the sacrificial layer, 202, will determine the position of the electrodes within the bowl. In this case, the thickness is chosen to position the discharge at the focal point of the bowl. Should there be residual stress, which would cause the electrodes to move when released, then thickness is chosen to compensate for this movement. In general the thickness will be some fraction of the depth of the bowl, from several to tens of microns.

Referring again to FIG. 1A, the light is shown traveling along a path 113. Thus light is emitted towards the IMod array, where it is acted on and subsequently reflected by the array along paths 110, towards interface 107 and the viewer 111.

The lamps may be fabricated without including the reflector layer so that they may emit light omnidirectionally.

Lamps fabricated with or without the reflector may be used in a variety of applications requiring microscopic light sources or light source arrays. These could include projection displays, backlights for emissive flat panel displays, or ordinary light sources for internal (homes, buildings) or external (automobiles, flashlights) use.

Figure 1B:
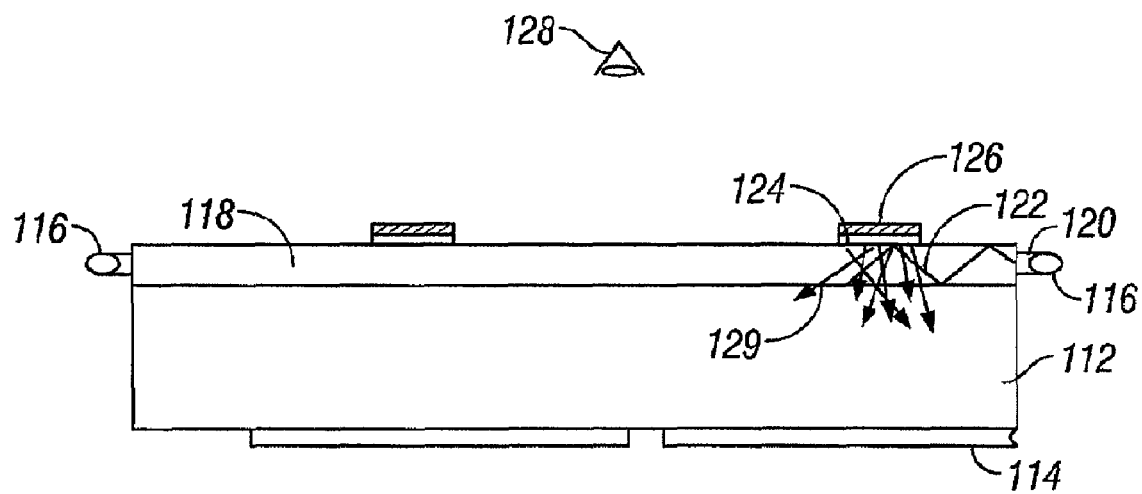
FIG. 1B reveals another scheme for supplemental lighting.

Referring to FIG. 1B, an alternative supplemental lighting approach is shown. Light guide 118 comprises a glass or plastic layer that has been bonded to substrate 112. Light source 116 which could comprise any number of emissive sources such as fluorescent tubes, LED arrays, or the aforementioned micro-lamp arrays, is mounted on opposite sides of the light guide. The light 122 is coupled into the light guide using a collimator 120 such that most of the light is trapped within the guide via total internal reflection. Scatter pad 124 is an area of the light guide that has been roughened using wet or dry chemical means. The scatter pad is coated with a material or thin film stack 126 which presents a reflective surface towards substrate 112 and an absorbing surface towards the viewer 128.

When light trapped within the guide is incident upon the scatter pad, the conditions for total internal reflection are violated and some portion 129 of the light scatters in all directions. Scattered light which would normally escape into the surrounding medium, i.e. towards the viewer, 128, is reflected into substrate 112 due to the presence of the reflective side of coating 126. Like the aforementioned micro-lamps, the scatter pads are fabricated in an array, with each pad dimensioned such that the portion of the display that it obscures from direct view is hardly noticeable. While these dimensions are small, on the order of tens of microns, they can provide sufficient supplemental lighting because of the inherent optical efficiency of the underlying IMod array 114. The shape of the scatter pad may be circular, rectangular, or of arbitrary shapes which may minimize their perception by the viewer.

Addressing Elements in an Array

In order to actuate arrays of IMods in a coordinated fashion for display purposes, a sequence of voltages is applied to the rows and columns of the array in what is generally known as a "line at a time" fashion. The basic concept is to apply a sufficient voltage to a particular row such that voltages applied to selected columns cause corresponding elements on the selected row to actuate or release depending on the column voltage. The thresholds and applied voltages must be such that only the elements on the selected row are affected by the application of the column voltages. An entire array can be addressed over a period of time by sequentially selecting the set of rows comprising the display.

Figure 3:
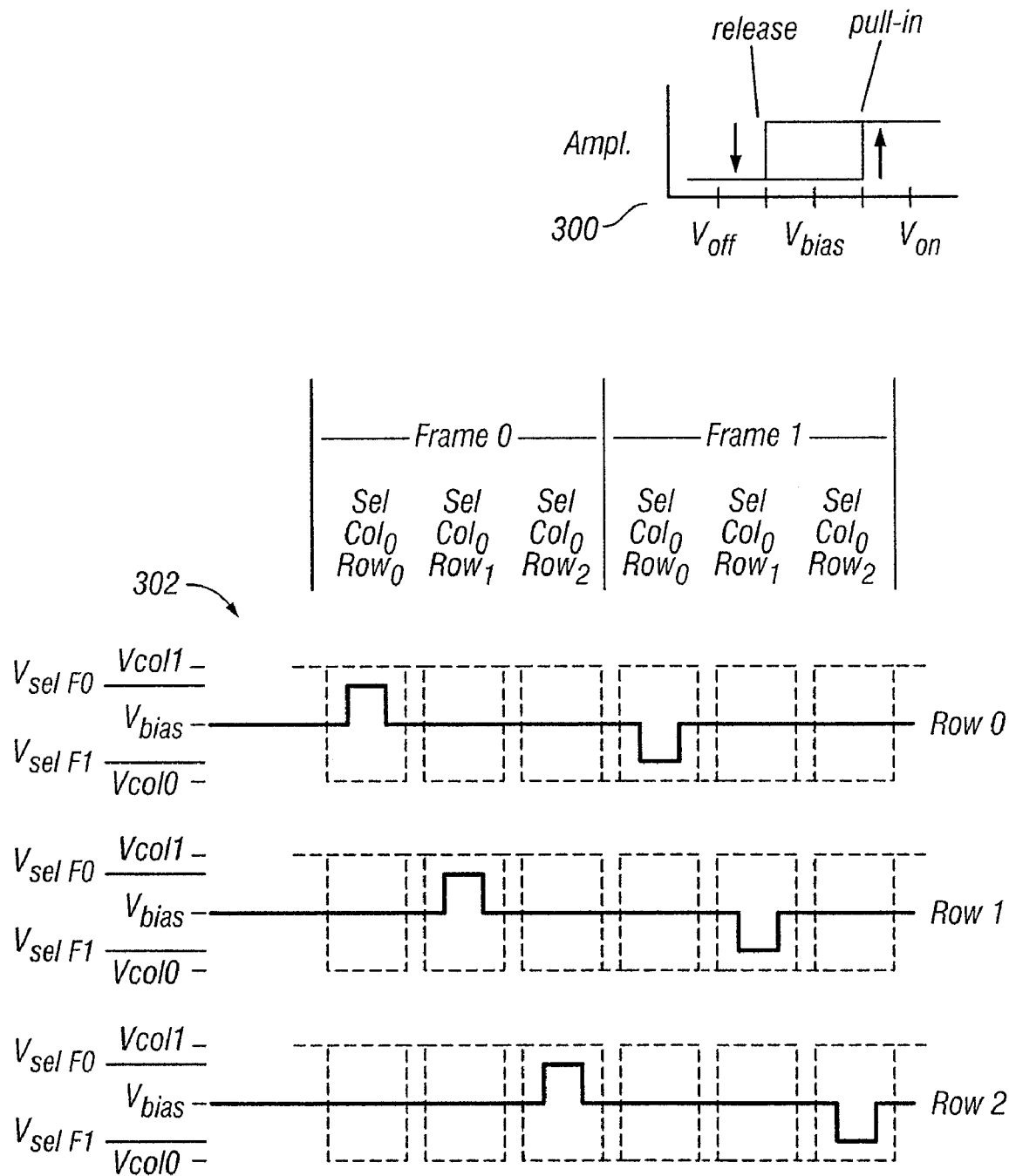
FIG. 3 illustrates a bias centered driving scheme for arrays of IMods in a display.

One simple way of accomplishing this is shown in FIG. 3. Hysteresis curve 300 is an idealized representation of the electroptical response of a reflective IMod. The x-axis shows applied voltage, and the y-axis shows amplitude of reflected light. The IMod exhibits hysteresis because, as the voltage is increased past the pull-in threshold, the IMod structure actuates and becomes highly absorbing. When the applied voltage is decreased, the applied voltage must be brought below the release threshold in order for the structure to move back into the un-actuated state. The difference between the pull-in and release thresholds produces the hysteresis window. The hysteresis effect, as well as an alternative addressing scheme, is discussed in U.S. patent application Ser. No. 08/744,253, filed on Nov. 5, 1996, and incorporated by reference. The hysteresis window can be exploited by maintaining a bias voltage Vbias, at all times, to keep the IMod In whatever state it was driven or released into. Voltages Voff and Von correspond to voltages required to actuate or release the IMod structure. The array is driven by applying voltages to the columns and rows using electronics known as column and row drivers. IMods have been fabricated with a pull-in threshold of 6 volts, and a release threshold of 3 volts. For such a device, typical values for Vbias, Voff, and Von are 4.5 volts, 0 volts, and 9 volts respectively.

In FIG. 3, timing diagram 302 illustrates the kind of waveforms that may be applied to actuate an array of IMods that exhibit a hysteresis curve resembling curve 300. A total of five voltages, two column voltages and three row voltages, are required. The voltages are selected such that Vcol1 is exactly twice the value of Vbias, and Vcol0 is zero volts. The row voltages are selected so that the difference between Vsel F1 and Vcol0 equals Von, and the difference between Vsel F1 and Vcol1 equals Voff. Conversely, the difference between Vsel F1 and Vcol1 equals Von, and the difference between Vsel F1 and Vcol0 equals Voff.

The addressing occurs in alternating frames 0 and 1. In a typical addressing sequence, data for row 0 is loaded into the column drivers during frame 0 resulting in either a voltage level of Vcol1 or Vcol0 being applied depending on whether the data is a binary one or zero respectively. When the data has settled, row driver 0 applies a select pulse with the value of Vsel F1. This results in any IMods on columns with Vcol0 present becoming actuated, and IMods on columns with Vcol1 present, releasing. The data for the next row is loaded into the columns and a select pulse applied to that row and so on sequentially until the end of the display is reached. Addressing is then begun again with row 0; however this time the addressing occurs within frame 1.

The difference between the frames is that the correspondence between data and column voltages is switched, a binary zero is now represented by Vcol0, and the row select pulse is now at the level of Vsel F1. Using this technique, the overall polarity of the voltages applied to the display array is alternated with each frame. This is useful, especially for MEMS based displays, because it allows for the compensation of any DC level charge buildup that can occur when only voltages of a single polarity are applied. The buildup of a charge within the structure can significantly offset the electroptical curve of the IMod or other MEM device.

Color Display Scheme

Because the IMod is a versatile device with a variety of potential optical responses, a number of different color display schemes are enabled having different attributes. One potential scheme exploits the fact that there are binary IMod designs that are capable of achieving color states, black states, and white states in the same IMod. This capability can be used to achieve a color scheme that can be described as "base +pigment". This terminology is used because the approach is analogous to the way in which paint colors are produced by adding pigments to a white base to achieve a desired color. Using this approach, a particular paint can attain any color in the spectrum and any level of saturation by controlling the content and amount of pigments that are added to the base. The same can be said for a display that incorporates colored and black and white pixels.

Figure 4A:
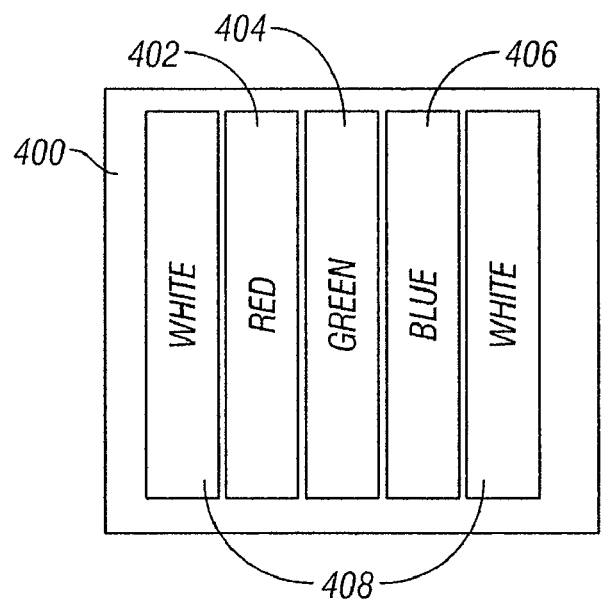
FIG. 4A is a diagram which illustrates a color display scheme based on the concept of "base+pigment".

As shown in FIG. 4A, a pixel 400 comprises five subpixel elements, 402, 404, 406, and 408, with each sub pixel capable of reflecting red, green, blue, and white respectively. All of the sub pixels are capable of a black state. Control over the brightness of each subpixel can be accomplished using pulse width modulation related techniques as discussed in U.S. Pat. No. 5,835,255. In conjunction with properly selected relative subpixel sizes, this results in a pixel over which a very large degree of control can be exercised of brightness and saturation. For example, by minimizing the overall brightness of the white subpixels, highly saturated colors may be achieved. Conversely, by minimizing the brightness of the color subpixels, or by maximizing them in conjunction with the white subpixels, a bright black and white mode may be achieved. All variations in between are obviously attainable as well.

User Control of Color Scheme

The previously described color scheme, as well as the inherent attributes of an IMod-based display in terms of resolution, gray scale depth, and refresh rate, provides flexibility in display performance. Given this range, it is useful to give the user of a product containing such a display control over its general characteristics. Alternatively, it may be advantageous for the display to automatically adapt to different viewing needs.

For example, a user may want to use a product in black and white mode if, some context, only text were being viewed. In another situation, however, the user may want to view high quality color still images, or in yet another mode may want to view live video. Each of these modes, while potentially within the range of a given IMod display configuration, requires tradeoffs in particular attributes. Tradeoffs include the need for low refresh rates if high-resolution imagery is required, or the ability to achieve high gray scale depth if only black and white is requested.

To give the user this kind of on demand flexibility, the controller hardware may be reconfigurable to some extent. Tradeoffs are a consequence of the fact that any display has only a certain amount of bandwidth, which is fundamentally limited by the response time of the pixel elements and thus determines the amount of information which can be displayed at a given time.

Figure 4B:
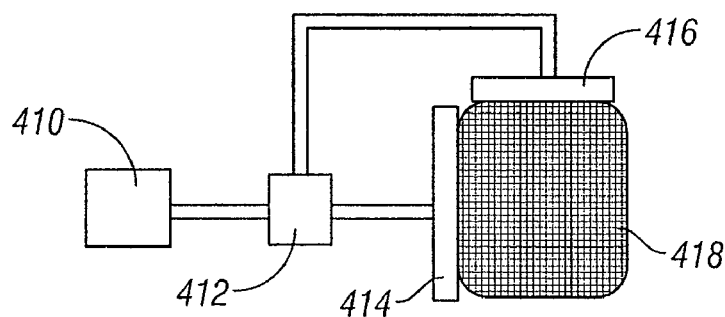
FIG. 4B reveals a block diagram of a system that provides for field reconfigurable display centric products.

One display architecture that could provide such flexibility is illustrated in FIG. 4B. In this block diagram, controller logic 412 is implemented using one of a variety of IC technologies, including programmable logic devices (PLAs) and field programmable gate arrays (FPGAs), which allow for the functionality of the component to be altered or reconfigured after it leaves the factory. Such devices, which are traditionally used for specialized applications such as digital signal processing or image compression, can provide the high performance necessary for such processing, while supplying flexibility during the design stage of products incorporating such devices.

The controller 412 provides signals and data to the driver electronics 414 and 416 for addressing the display 418. Conventional controllers are based on IC's or Application Specific Integrated Circuits (ASICs), which are effectively "programmed" by virtue of their design during manufacture. The term program, in this case, means an internal chip layout comprising numerous basic and higher level logical components (logic gates and logic modules or assemblies of gates). By using field programmable devices such PLAs or FPGAs, different display configurations may be loaded into the display controller component in the form of hardware applications or "hardapps", from a component 410, which could be memory or a conventional microprocessor and memory. The memory could be in the form of EEPROMS or other reprogrammable storage devices, and the microprocessor could take on the form of simple microcontroller whose function is to load the hardapp from memory into the FPGA, unless this were performed by whatever processor is associated with the general functioning of the product. This approach is advantageous because with relatively simple circuitry it is possible to achieve a wide variety of different display performance configurations and mixed display scan rates, along with the potential to combine them.

One portion of the screen, for example, might be operated as a low-resolution text entry area, while another provides high quality rendition of an incoming email. This could be accomplished, within the overall bandwidth limitations of the display, by varying the refresh rate and # of scans for different segments of the display. The low-resolution text area could be scanned rapidly and only once or twice corresponding to one or two bits of gray scale depth. The high rendition email area could be scanned rapidly and with three or four passes corresponding to three or four bits of grayscale.

Configurable Electronic Products

Figure 4C:
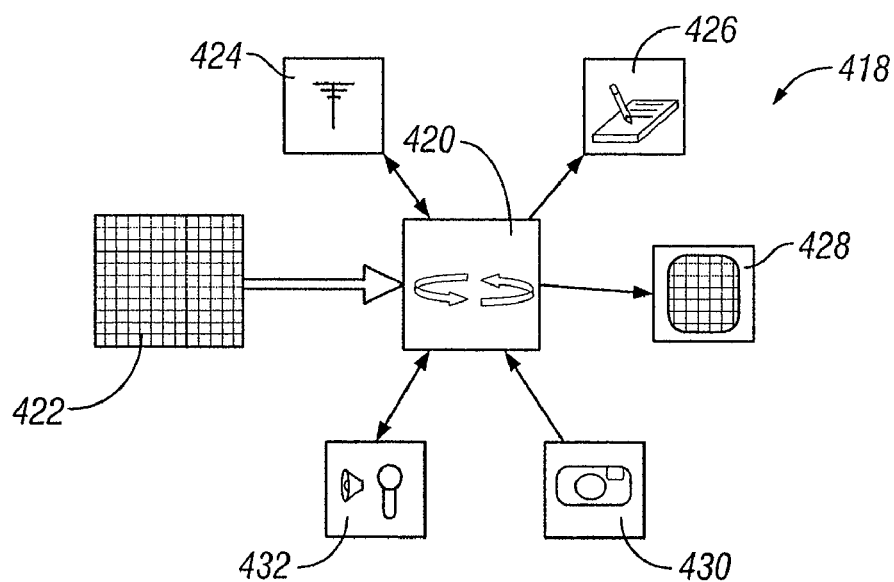
FIG. 4C illustrates the concept as applied to a general-purpose display-centric product.

This idea may be generalized to include not just the functionality of the display controller, but also the functionality of the overall product. FIG. 4C shows a configuration of a generic portable electronic product 418 that has a programmable logic device or equivalent at its core 420. In many display centric personal electronic products, such as PDAs (personal digital assistants) and electronic organizers, the central processor is a variant of a RISC processor that uses a reduced instruction set. While RISC processors are more efficient versions of CPUs that power most personal computers, they are still general-purpose processors that expend a lot of energy performing repetitive tasks such as retrieving instructions from memory.

In personal computers, power consumption is not an issue, and the user typically wants to run a large number of complicated software applications. The opposite is true of typical display centric/personal electronic products. They are required to consume low power and offer a relatively small number of relatively simple programs. Such a regime favors implementing the special purpose programs, which could include web browsers, calendar functions, drawing programs, telephone/address databases, and handwriting/speech recognition among others, as hardapps. Thus whenever a particular mode of functionality, e.g., a program, is required by the user, the core processor is reconfigured with the appropriate hardapp and the user interacts with the product. Thus the hardapp processor, a variant of a Field Programmable Gate Array has the hardapp (i.e. program) manifested in its internal logic and connections, which get re-arranged and re-wired every time a new hardapp is loaded. Numerous suppliers of these components also provide an application development system that allows a specialized programming language (a hardware description language) to be reduced into the logical representation that makes up the appropriate processor. Numerous efforts are also underway to simplify the process or reducing higher level programming languages into this form as well. One approach to realizing such a processor is detailed in the paper Kouichi Nagami, et al, "Plastic Cell Architecture:

Towards Reconfigurable Computing for General-Purpose", Proc. IEEE Workshop on FPGA-based Custom Computing Machines, 1998.

Referring again to FIG. 4C, the hardapp processor 420 is shown at the center of a collection of I/O devices and peripherals that it will utilize, modify, or ignore based on the nature and function of the hardapp currently loaded. The hardapps can be loaded from memory 422 resident in the product, or from an external source via RF or IR interface, 424, which could pull hardapps from the internet, cellular networks, or other electronic devices, along with content for a particular hardapp application. Other examples of hardapps include voice recognition or speech synthesis algorithms for the audio interface 432, handwriting recognition algorithms for pen input 426, and image compression and processing modes for image input device 430. Such a product could perform a myriad of functions by virtue of its major components, the display as the primary user interface and the reconfigurable core processor. Total power consumption for such a device could be on the order of tens of milliwatts versus the several hundred milliwatts consumed by existing products.

Decoupling Electromechanical Aspects From Optical Aspects

Figure 5A:
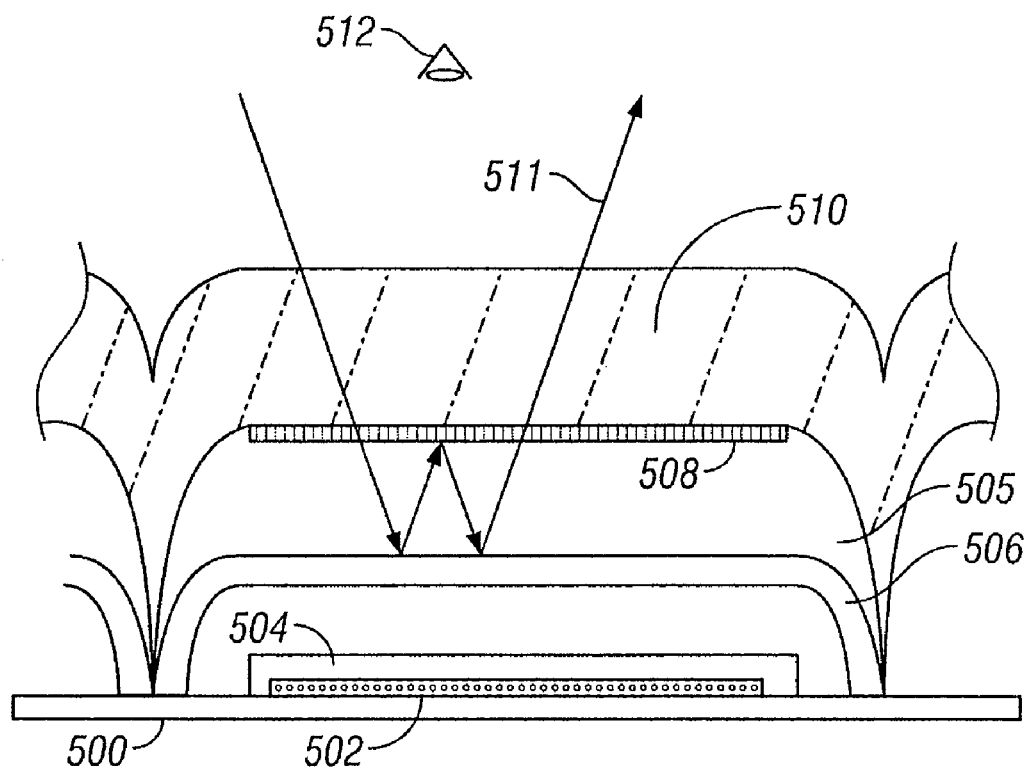
FIG. 5A is a diagram revealing an IMod geometry that decouples the optical behavior from the electromechanical behavior, shown in the un-actuated state.
Figure 5B:
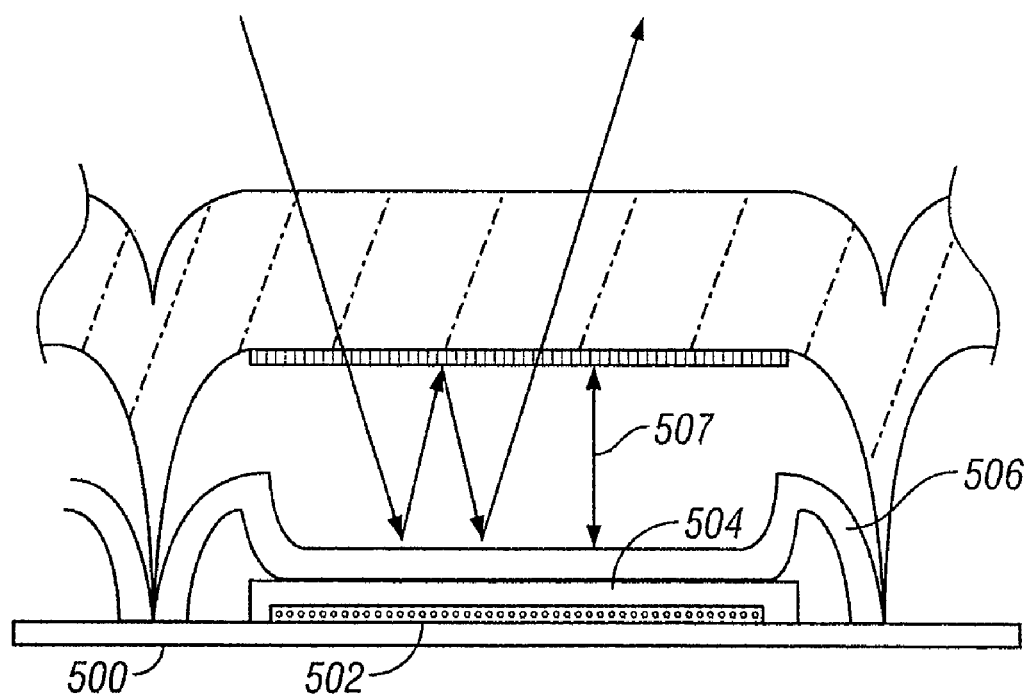
FIG. 5B shows the same IMod in the actuated state.

U.S. patent application Ser. No. 08/769,947, filed on Dec. 19, 1996, and 09/056,975 filed on Apr. 4, 1998, and incorporated by reference, have described IMod designs that propose to decouple the electromechanical performance of an IMod from its optical performance. Another way in which this may be accomplished is illustrated in FIGS. 5A and 5B. This design uses electrostatic forces to alter the geometry of an interferometric cavity. Electrode 502 is fabricated on substrate 500 and electrically isolated from membrane/mirror 506 by insulating film 504. Electrode 502 functions only as an electrode, not also as a mirror.

Figure 5C:
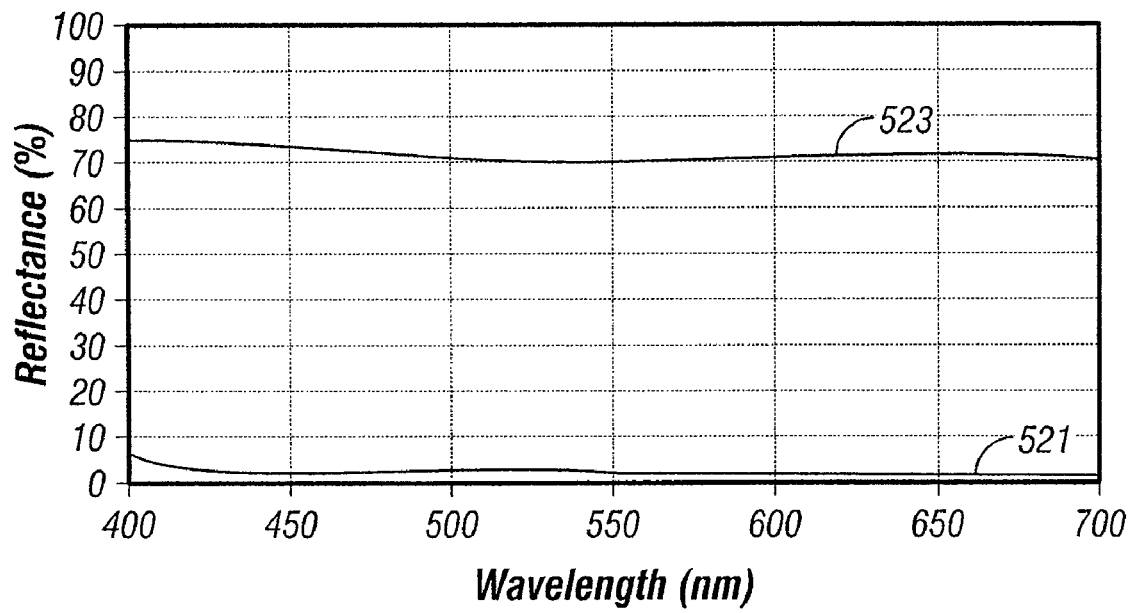
FIG. 5C is a plot showing the performance of this IMod design in the black and white state.
Figure 5D:
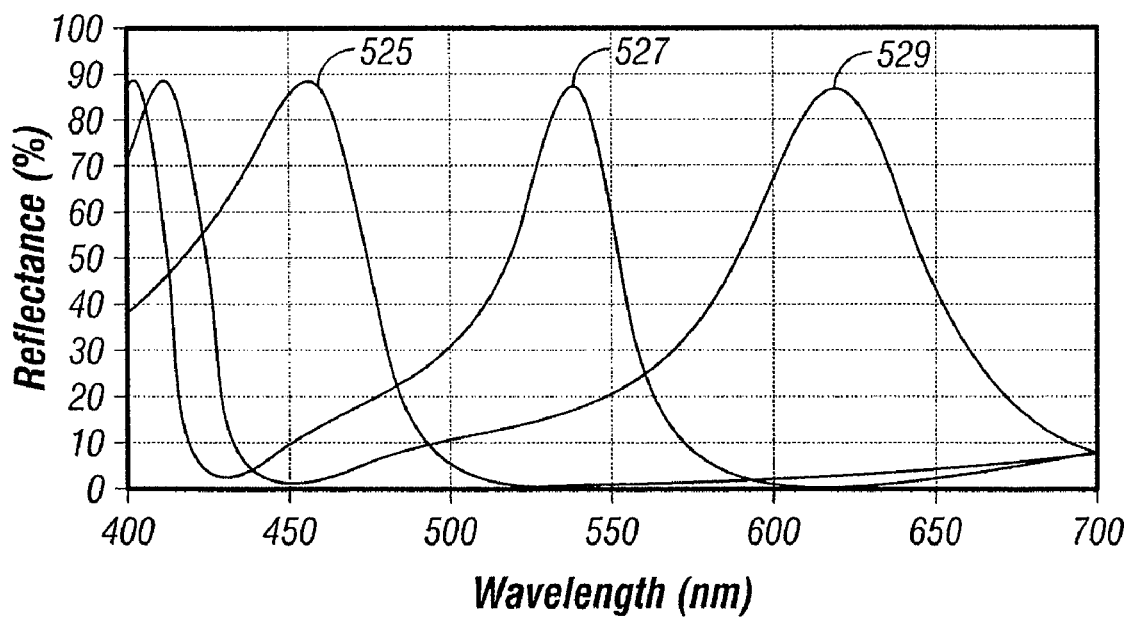
FIG. 5D is a plot showing the performance of several color states.

An optical cavity 505 is formed between membrane/mirror 506 and secondary mirror 508. Support for secondary mirror 508 is provided by a transparent superstructure 510, which can be a thick deposited organic, such as SU-8, polyimide, or an inorganic material. With no voltage applied, the membrane/mirror 506, maintains a certain position shown in FIG. 5A, relative to secondary mirror 508, as determined by the thickness of the sacrificial layers deposited during manufacture. For an actuation voltage of about four volts a thickness of several thousand angstroms might be appropriate. If the secondary mirror is made from a suitable material, say chromium, and the mirror/membrane made from a reflective material such as aluminum, then the structure will reflect certain frequencies of light 511 which may be perceived by viewer 512. In particular, if the chromium is thin enough to be semitransparent, about 40 angstroms, and the aluminum sufficiently thick, at least 500 angstroms, as to be opaque, then the structure may have a wide variety of optical responses. FIGS. 5C and 5D show examples of black and white and color responses respectively, all of which are determined by the cavity length, and the thickness of the constituent layers.

FIG. 5B shows the result of a voltage applied between primary electrode 502 and membrane mirror 506. The membrane/mirror is vertically displaced thus changing the length of the optical cavity and therefore the optical properties of the IMod. FIG. 5C shows one kind of reflective optical response which is possible with the two states, illustrating the black state 521 when the device is fully actuated, and a white state 523 when the device is not. FIG. 5D shows an optical response with color peaks 525, 527, and 529, corresponding to the colors blue, green, and red respectively. The electromechanical behavior of the device thus may be controlled independently of the optical performance. Materials and configuration of the primary electrode, which influence the electromechanics, may be selected independently of the materials comprising the secondary mirror, because they play no role in the optical performance of the IMod. This design may be fabricated using processes and techniques of surface micromachining, for example, the ones described in U.S. patent application Ser. No. 08/688,710, filed on Jul. 31, 1996 and incorporated by reference.

Figure 6A:
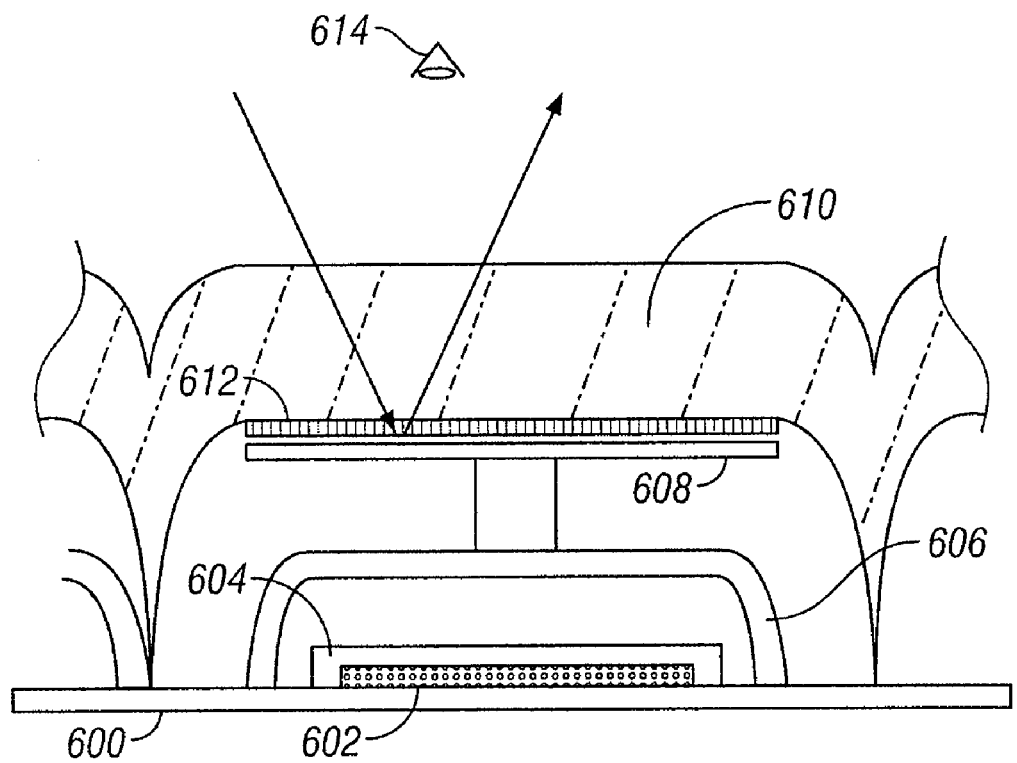
FIG. 6A shows a diagram of an IMod that similarly decouples the optical behavior from the electromechanical, however the support structure is hidden.
Figure 6B:
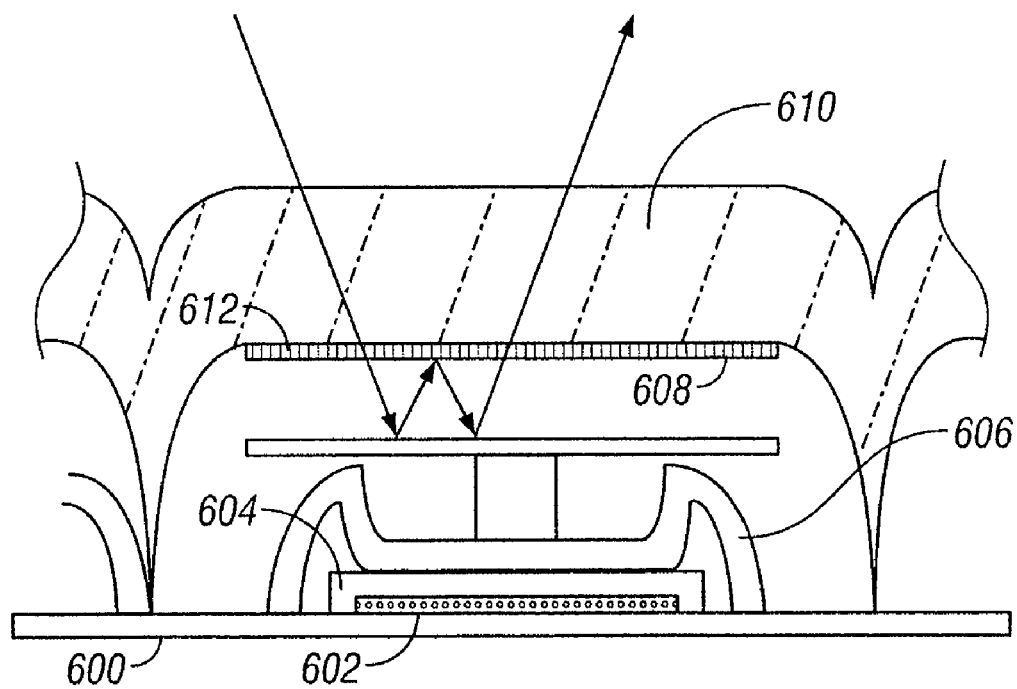
FIG. 6B shows the same design in the actuated state.

In another example, shown in FIG. 6A, the support structure for the IMod 606 is positioned to be hidden by the membrane/mirror 608. In this way the amount of inactive area is effectively reduced because the viewer sees only the area covered by the membrane/mirror and the minimum space between adjoining IMods. This is unlike the structure in FIG. 5A where the membrane supports are visible and constitute inactive and inaccurate, from a color standpoint, area. FIG. 6B, reveals the same structure in the actuated state.

Figure 7A:
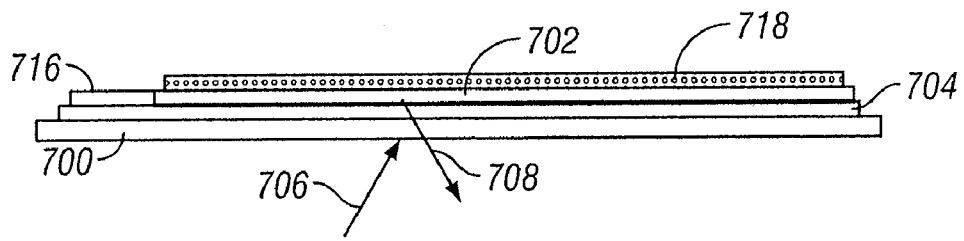
FIG. 7A illustrates an IMod design that utilizes anisotropically stressed membranes, in one state.

In FIG. 7A, another geometric configuration is illustrated for use in an IMod structure. This design is similar to one shown in U.S. Pat. No. 5,638,084. That design relied upon an opaque plastic membrane that is anisotropically stressed so that it naturally resides in a curled state. Application of a voltage flattens the membrane to provide a MEMS-based light shutter.

The device's functionality may be improved by making it interferometric. The IMod variation is shown in FIG. 7A where thin film stack 704 is like the dielectric/conductor/insulator stack which is the basis for the induced absorber IMod design discussed in U.S. patent application Ser. No. 08/688,710, filed on Jul. 31, 1996 and incorporated by reference.

Application of a voltage between aluminum membrane 702 and stack 704 causes the membrane 702 to lie flat against the stack. During fabrication, aluminum 702, which could also include other reflective metals (silver, copper, nickel), or dielectrics or organic materials which have been undercoated with a reflective metal, is deposited on a thin sacrificial layer so that it may be released, using wet etch or gas phase release techniques. Aluminum membrane 702 is further mechanically secured to the substrate by a support tab 716, which is deposited directly on optical stack 704. Because of this, light that is incident on the area where the tab and the stack overlap is absorbed making this mechanically inactive area optically inactive as well. This technique eliminates the need for a separate black mask in this and other IMod designs.

Incident light 706 is either completely absorbed or a particular frequency of light 708, is reflected depending on the spacing of the layers of the stack. The optical behavior is like that of the induced absorber IMod described in U.S. patent application Ser. No. 08/688,710, filed on Jul. 31, 1996, and incorporated by reference.

Figure 7B:
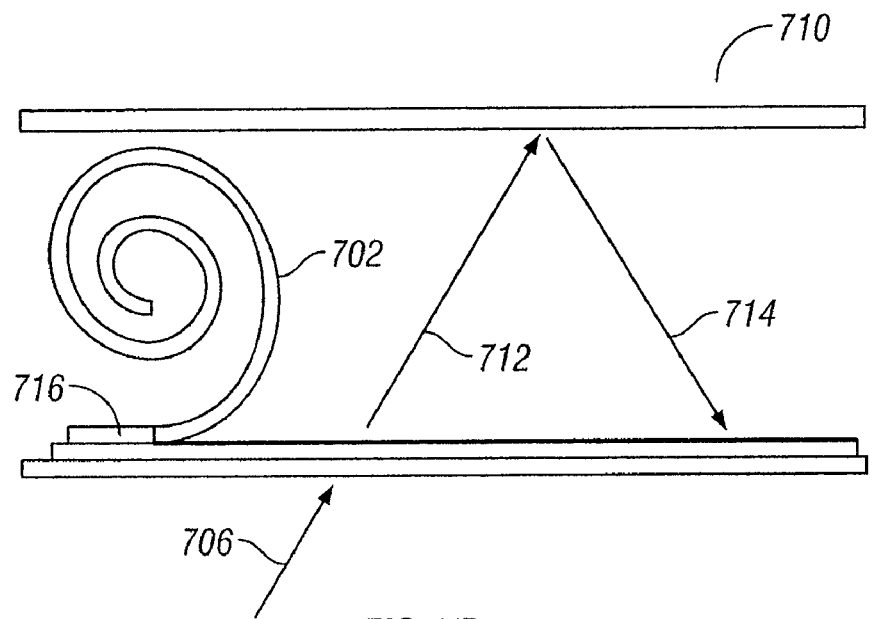
FIG. 7B shows the same IMod in another state.

FIG. 7B shows the device configuration when no voltage is applied. The residual stresses in the membrane induce it to curl up into a tightly wound coil. The residual stresses can be imparted by deposition of a thin layer of material 718 on top of the membrane, which has extremely high residual tensile stress. Chromium is one example in which high stresses may be achieved with a film thickness a low as several hundred angstroms. With the membrane no longer obstructing its path,ight beam 706 is allowed to pass through the stack 704 and intersect with plate 710. Plate 710 can reside in a state of being either highly absorbing or highly reflective (of a particular color or white). For the modulator to be used in a reflective display, the optical stack 704 would be designed such that when the device is actuated it would either reflect a particular color (if plate 710 were absorbing) or be absorbing (if plate, 710 were reflective).

Rotational Actuation

Figure 8A:
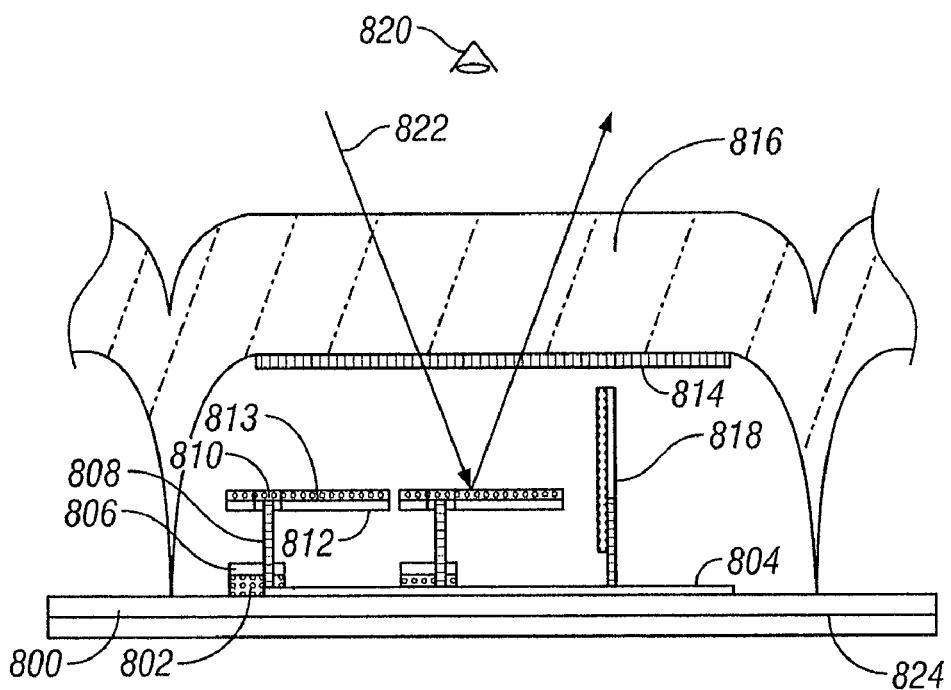
FIG. 8A is an illustration showing an IMod that relies on rotational actuation.

As shown in FIG. 8A, another IMod geometry relies on rotational actuation. Using the processes discussed in U.S. patent application Ser. No. 08/688,710, filed on Jul. 31, 1996 and incorporated by reference, electrode 802, an aluminum film about 1000 angstroms thick, is fabricated on substrate 800. Support post 808 and rotational hinge 810, support shutter 812, upon which a set of reflecting films 813 has been deposited. The support shutter may be an aluminum film which is several thousand angstroms thick. Its X-Y dimensions could be on the order of tens to several hundred microns. The films may be interferometric and designed to reflect particular colors. A fixed interferometric stack in the form of an induced absorber like that described in U.S. patent application Ser. No. 08/688,710, filed on Jul. 31, 1996 and incorporated by reference would suffice. They may also comprise polymers infused with color pigments, or they may be aluminum or silver to provide broadband reflection. The electrode 802 and the shutter 812 are designed such that the application of a voltage (e.g., 10 volts) between the two causes the shutter 812 to experience partial or full rotation about the axis of the hinge. Only shutter 818 is shown in a rotated state although typically all of the shutters for a given pixel would be driven in unison by a signal on the common bus electrode 804. Such a shutter would experience a form of electromechanical hysteresis if the hinges and electrode distances were designed such that the electrostatic attraction of the electrodes overcomes the spring tension of the hinge at some point during the rotation. The shutters would thus have two electromechanically stable states.

In a transmissive mode of operation, the shutter would either block incident light or allow it to pass through. FIG. 8A illustrates the reflective mode where incident light 822 is reflected back to the viewer 820. In this mode, and in one state, the shutter either reflects a white light, if the shutter is metallized, or reflects a particular color or set of colors, if it is coated with interferometric films or pigments. Representative thicknesses and resulting colors, for an interferometric stack, are also described in U.S. patent application Ser. No. 08/688,710, filed on Jul. 31, 1996 and incorporated by reference. In the other state, the light is allowed to pass through and be absorbed in substrate 800 if the opposite side of the shutter were coated with an absorbing film or films 722. These films could comprise another pigment infused organic film, or an induced absorber stack designed to be absorbing. Conversely, the shutters may be highly absorbing, i.e., black, and the opposite side of substrate 800 coated with highly reflective films 824, or be selectively coated with pigment or interferometric films to reflect colors, along the lines of the color reflecting films described above.

Operation of the device may be further enhanced by the addition of supplementary electrode 814, which provides additional torque to the shutter when charged to a potential that induces electrostatic attraction between supplementary electrode 814 and shutter 812. Supplementary electrode 814 comprises a combination of a conductor 814 and support structure 816. The electrode may comprise a transparent conductor such as ITO that could be about thousand angstroms thick. All of the structures and associated electrodes are machined from materials that are deposited on the surface of a single substrate, i.e. monolithically, and therefore are easily fabricated and reliably actuated due to good control over electrode gap spaces. For example, if such an electrode were mounted on an opposing substrate, variations in the surface of both the device substrate and opposing substrate could combine to produce deviations as much as several microns or more. Thus the voltage required to affect a particular change in behavior could vary by as much as several tens of volts or more. Structures that are monolithic follow substrate surface variations exactly and suffer little such variation.

FIG. 8B, steps 1-7, shows a fabrication sequence for the rotational modulator. In step 1, substrate 830 has been coated with electrode 832 and insulator 834. Typical electrode and insulator materials are aluminum and silicon dioxide, each of a thickness of one thousand angstroms each. These are patterned in step 2. Sacrificial spacer 836, a material such as silicon several microns in thickness, has been deposited and patterned in step 3 and coated with post/hinge/shutter material 838 in step 4. This could be an aluminum alloy or titanium/tungsten alloy about 1000 angstroms thick. In step 5, material 838 has been patterned to form bus electrode 844, support post 840, and shutter 842. Shutter reflector 846 has been deposited and patterned in step 6. In step 7, the sacrificial spacer has been etched away yielding the completed structure. Step 7 also reveals a top view of the structure showing detail of the hinge comprising support posts 848, torsion arm 850, and shutter 852.

Switching Elements

For IMods that are binary devices only a small number of voltage levels is required to address a display. The driver electronics need not generate analog signals that would be required to achieve gray scale operation.

Thus, the electronics may be implemented using other means as suggested in U.S. patent application Ser. No. 08/769,947, filed on Dec. 19, 1996 and incorporated by reference. In particular the drive electronics and logic functions can be implemented using switch elements based on MEMS.

Figure 9A:
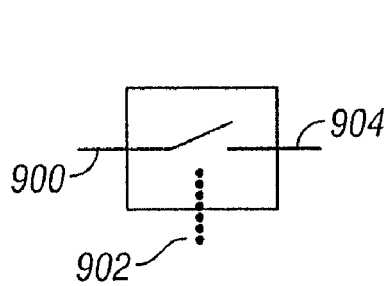
FIG. 9A is a block diagram of a MEMS switch.
Figure 9B:
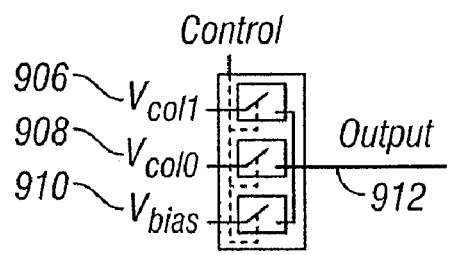
FIG. 9B is a block diagram of a row driver based on MEMS switches.
Figure 9C:
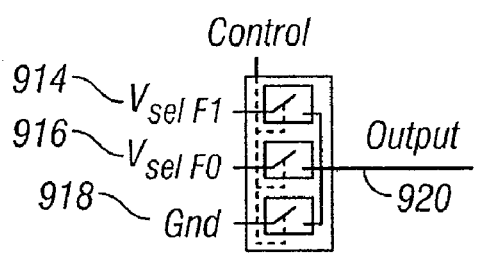
FIG. 9C is a block diagram of a column driver based on MEMS switches.
Figure 9D:
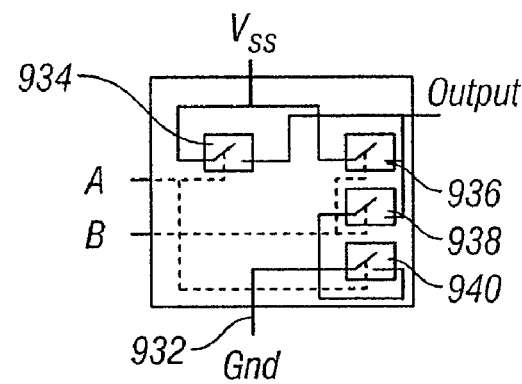
FIG. 9D is a block diagram of a NAND gate based on MEMS switches.
Figure 9E:
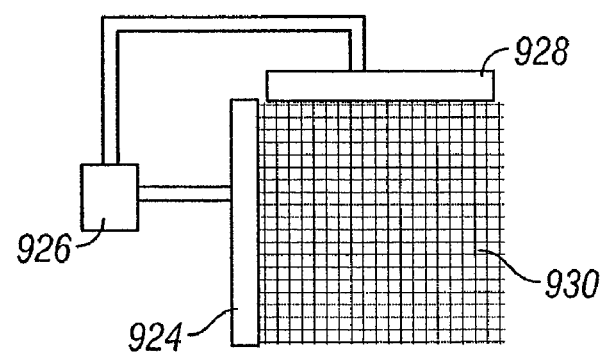
FIG. 9E is a block diagram of a display system incorporating MEMS based logic and driver components.

FIGS. 9A through 9E illustrate the concept. FIG. 9A is a diagram of a basic switch building block with an input 900 making a connection to output 904 by application of a control signal 902. FIG. 9B illustrates how a row driver could be implemented. The row driver for the addressing scheme described above requires the output of three voltage levels. Application of the appropriate control signals to the row driver allows one of the input voltage levels to be selected for output 903. The input voltages are Vcol1, Vcol0, and Vbias corresponding to 906, 908, and 910 in the figure. Similarly, for the column driver shown in FIG. 9C, the appropriate control signals result in the selection of one or the other input voltage levels for delivery to the output 920. The input voltages are Vsel F1, Vsel F1, and ground, corresponding to 914, 916, and 918 in the figure. FIG. 9D illustrates how a logic device 932, may be implemented, in this case a NAND gate, using basic switch building blocks 934, 936, 938, and 940. All of these components can be configured and combined in a way that allows for the fabrication of the display subsystem shown in FIG. 9E. The subsystem comprises controller logic 926, row driver 924, column driver 928, and display array 930, and uses the addressing scheme described above in FIG. 3.

Fabrication of the switch elements as MEMS devices makes it possible to fabricate an entire display system using a single process. The switch fabrication process becomes a subprocess of the IMod fabrication process and is illustrated in FIGS. 10A-10H.

Figure 10A:
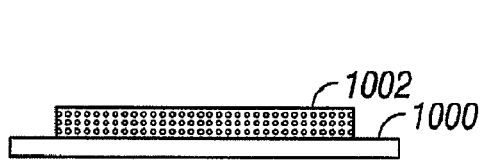
FIGS. 10A-10H show the structure, fabrication, and operation of a MEMS switch.
Figure 10B:
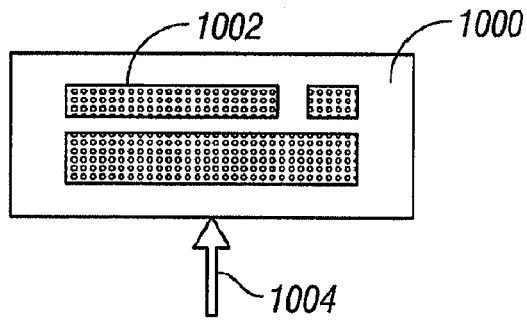

Referring to FIGS. 10A and 10B, the initial stage of the IMods fabrication process is shown, FIG. 10A. Arrow 1004 indicates the direction of the perspective of the side view. Substrate 1000 has had sacrificial spacer 1002 a silicon layer 2000 angstroms thick deposited and patterned on its surface.

Figure 10C:
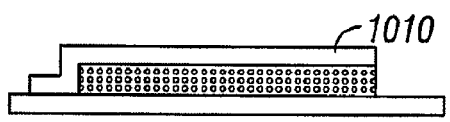
Figure 10D:
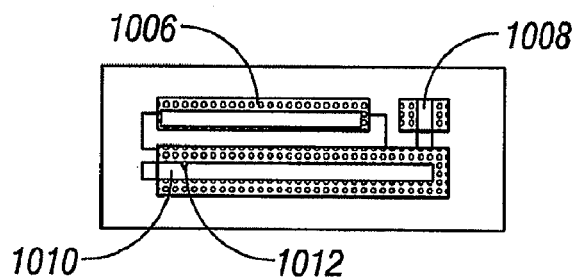

Referring to FIGS. 10C and 10D, the second stage of the IMods fabrication process is shown. A structural material, an aluminum alloy several microns thick, has been deposited and patterned to form source beam 1010, drain structure 1008, and gate structure 1006. Several hundred angstroms of a non-corroding metal such as gold, iridium or platinum may be plated onto the structural material at this point to maintain low contact resistance through the life of the switch. Notch 1012 has been etched in source beam 1010 to facilitate the movement of the beam in a plane parallel to that of the substrate.

Figure 10E:
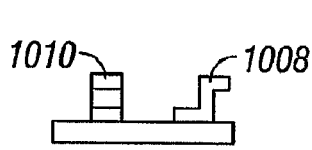
Figure 10F:
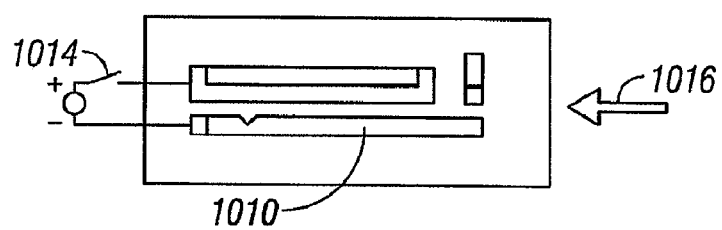

Referring to FIGS. 10E-10H, arrows 1016 indicate the direction of the perspective of the front view. Referring to FIGS. 10E and 10F, in the final stage of the IMod manufacturing process, the sacrificial material has been etched away leaving the source beam 1010 intact and free to move.

Figure 10G:
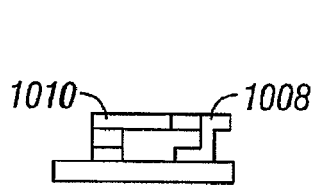
Figure 10H:
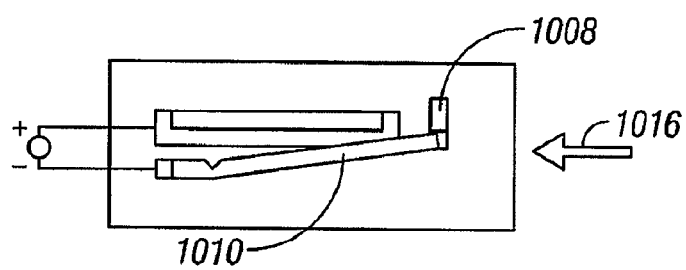

Referring to FIGS. 10G and 10H, when a voltage is applied between the source beam and the gate structure, the source beam 1010 is deflected towards gate 1006 until it comes into contact with the drain 1008, thereby establishing electrical contact between the source and the drain. The mode of actuation is parallel to the surface of the substrate, thus permitting a fabrication process that is compatible with the main IMod fabrication processes. This process also requires fewer steps than those used to fabricate switches that actuate in a direction normal the substrate surface.

Figure 10I:
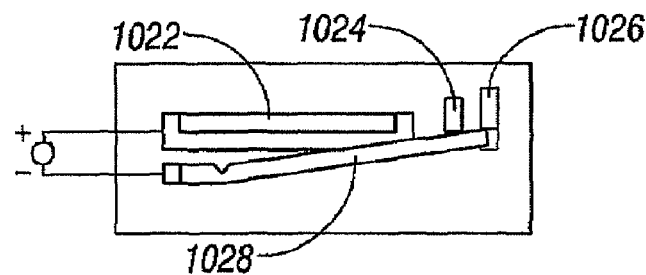
FIG. 10I illustrates an alternative switch design.
Figure 10J:
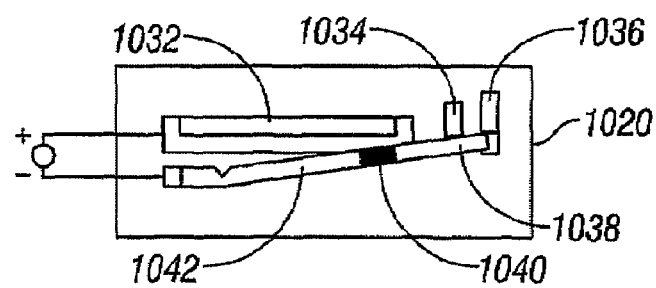
FIG. 10J illustrates a second alternative switch design.

FIGS. 10I and 10J illustrates two alternative designs for planar MEM switches. The switch in FIG. 10I differs in that switch beam 1028 serves to provide contact between drain 1024 and source 1026. In the switch of FIG. 10H, currents that must pass through the source beam to the drain may effect switching thresholds, complicating the design of circuits. This is not the case with switch 1020. The switch in FIG. 10J reveals a further enhancement. In this case, insulator 1040 electrically isolates switch beam 1042 from contact beam 1038. This insulator may be a material such as SiO2 that can be deposited and patterned using conventional techniques. Use of such a switch eliminates the need to electrically isolate switch drive voltages from logic signals in circuits comprising these switches.

Multidimensional Photonic Structures

In general, IMods feature elements that have useful optical properties and are movable by actuation means with respect to themselves or other electrical, mechanical or optical elements.

Assemblies of thin films to produce interferometric stacks are a subset of a larger class of structures that we shall refer to as multidimensional photonic structures. Broadly, we define a photonic structure as one that has the ability to modify the propagation of electromagnetic waves due to the geometry and associated changes in the refractive index of the structure. Such structures have a dimensional aspect because they interact with light primarily along one or more axes. Structures that are multidimensional have also been referred to as photonic bandgap structures (PBG's) or photonic crystals. The text "Photonic Crystals" by John D. Joannopoulos, et al describes photonic structures that are periodic.

Figure 16:
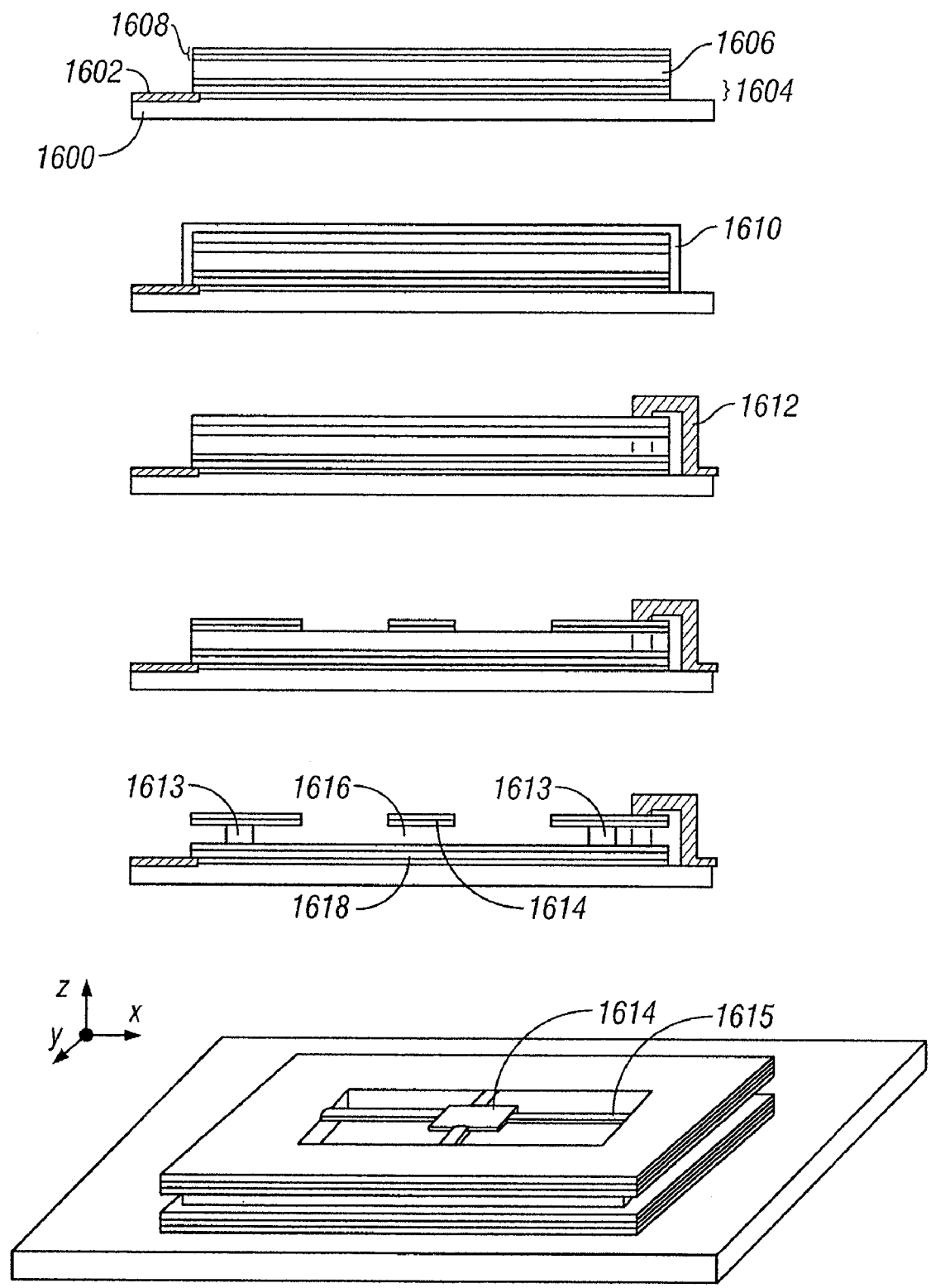
FIG. 16 shows the fabrication sequence for a tunable IMod structure.

A one-dimensional PBG can occur in the form of a thin film stack. By way of example, FIG. 16 shows the fabrication and end product of an IMod in the form of a dielectric Fabry-Perot filter. Thin film stacks 1614 and 1618, which could be alternating layers of silicon and silicon dioxide each a quarter wave thick, have been fabricated on a substrate to form an IMod structure that incorporates central cavity 1616. In general, the stack is continuous in the X and Y direction, but has a periodicity in the optical sense in the Z direction due to variations in the refractive index of the material as they are comprised of alternating layers with high and low indices. This structure can be considered one-dimensional because the effect of the periodicity is maximized for waves propagating along one axis, in this case the Z-axis.

Figure 11A:
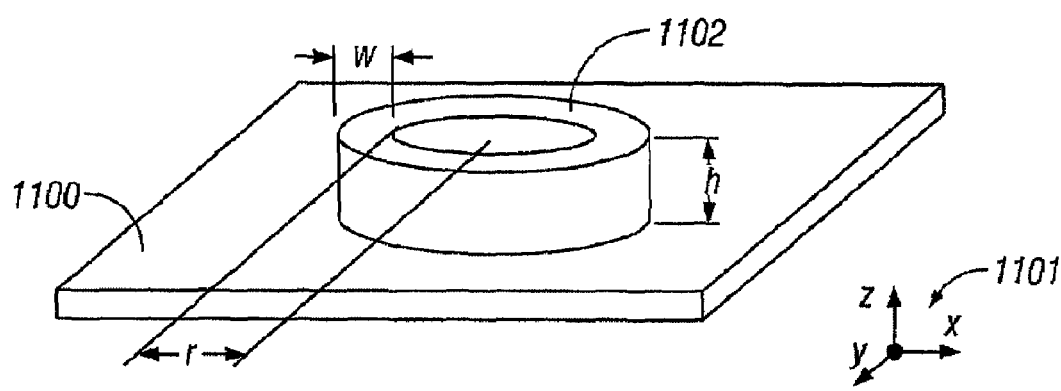
FIG. 11A is a drawing that shows examples of micro ring based 2-D photonic structure.
Figure 11B:
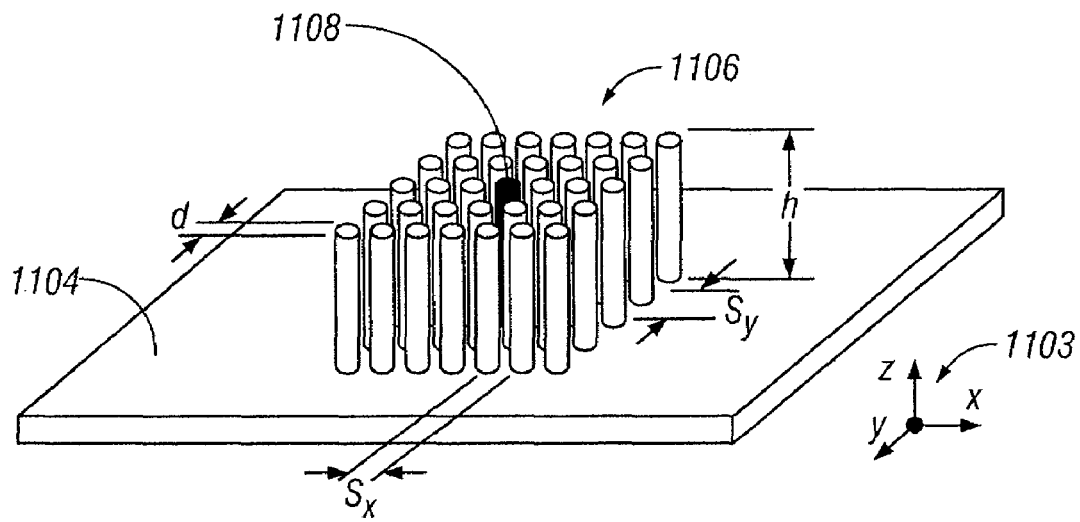
FIG. 11B is a drawing of a periodic 2-D photonic structure.

FIGS. 11A and 11B illustrate two manifestations of a two-dimensional photonic structure. In FIG. 11A, a microring resonator 1102 can be fabricated from one of a large number of well known materials, an alloy of tantalum pentoxide and silicon dioxide for example, using well known techniques. For a device optimized for wavelengths in the 1.55 µm range, typical dimensions are w=1.5 µm, h=1.0 µm, and r=10 µm.

Fabricated on a substrate 1100 (glass is one possibility though there are many others), the structure is essentially a circular waveguide whose refractive index and dimensions w, r, and h determine the frequencies and modes of light which will propagate within it. Such a resonator, if designed correctly, can act as a frequency selective filter for broadband radiation that is coupled into it. In this case, the radiation is generally propagating in the XY plane as indicated by orientation symbol 1101. The one-dimensional analog of this device would be a Fabry-Perot filter made using single layer mirrors. Neither device exhibits a high order optical periodicity, due to the single layer "boundaries" (i.e. mirrors); however, they can be considered photonic structures in the broad sense.

A more traditional PBG is shown in FIG. 11B. Columnar array 1106 presents a periodic variation in refractive index in both the X and Y directions. Electromagnetic radiation propagating through this medium is most significantly affected if it is propagating within the XY plane, indicated by orientation symbol 1103.

Because of its periodic nature, the array of FIG. 11B shares attributes with a one-dimensional thin film stack, except for its higher-order dimensionality. The array is periodic in the sense that along some axis through the array, within the XY plane; the index of refraction varies between that of the column material, and that of the surrounding material, which is usually air. Appropriate design of this array, utilizing variations on the same principles applied to the design of thin film stacks, allows for the fabrication of a wide variety of optical responses, (mirrors, bandpass filters, edge filters, etc.) acting on radiation traveling in the XY plane. Array 1106 in the case shown in FIG. 11B includes a singularity or defect 1108 in the form of a column that differs in its dimension and/or refractive index. For example, the diameter of this column might be fractionally larger or smaller than the remaining columns (which could be on the order of a quarter wavelength in diameter), or it may be of a different material (perhaps air vs. silicon dioxide). The overall size of the array is determined by the size of the optical system or component that needs to be manipulated. The defect may also occur in the form of the absence of a column or columns (a row), depending on the desired behavior. This structure is analogous to the dielectric Fabry-Perot filter of FIG. 16, but it functions in only two dimensions. In this case, the defect is analogous to the cavity, 1616. The remaining columns are analogous to the adjacent two-dimensional stacks.

The relevant dimensions of the structure of FIG. 11B are denoted by column x spacing sx, column y spacing sy, (either of which could be considered the lattice constant), column diameter d, and array height, h. Like the quarter wave stack, the one-dimensional equivalent, column diameters and spacings can be on the order of a quarter wave. The height, h, is determined by the desired propagation modes, with little more than one half wavelength used for single mode propagation. The equations for relating the size of the structures to their effect on light are well known and documented in the text "Photonic Crystals" by John D. Joannopoulos, et al.

This kind of structure may also be fabricated using the same materials and techniques used to fabricate the resonator 1102. For example, a single film of silicon may be deposited on a glass substrate and patterned, using conventional techniques, and etched using reactive ion etching to produce the high aspect ratio columns. For a wavelength of 1.55 μm, the diameter and spacing of the columns could be on the order of 0.5 μm and 0.1 μm respectively.

Photonic structures also make it possible to direct radiation under restrictive geometric constraints. Thus they are quite useful in applications where it is desirable to redirect and/or select certain frequencies or bands of frequencies of light when dimensional constraints are very tight. Waveguides, channeling light propagating in the XY plane, may be fabricated which can force light to make 90 degree turns in a space less than the wavelength of the light. This can be accomplished, for example, by creating the column defect in the form of a linear row, which can act as the waveguide.

Figure 12:
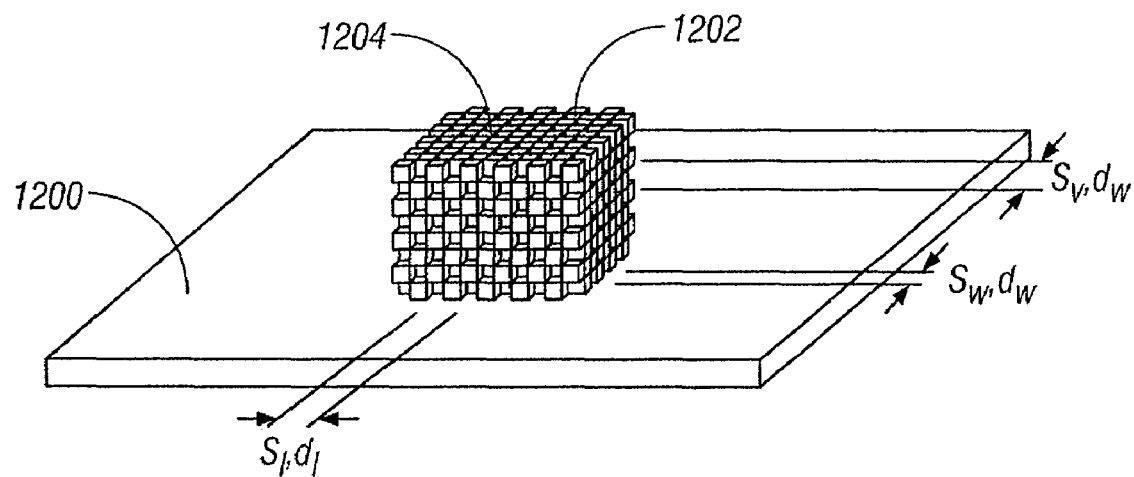
FIG. 12 is a diagram which revealing an example of a 3-D photonic structure.

A three-dimensional structure is illustrated in FIG. 12. Three-dimensional periodic structure 1202 acts on radiation propagating in the XY, YZ, and XZ planes. A variety of optical responses maybe attained by appropriate design of the structure and selection of its constituent materials. The same design rules apply, however they are applied three-dimensionally here. Defects occur in the form of points, lines, or regions, vs. points and lines, which differ in size and/or refractive index from the surrounding medium. In FIG. 12, the defect 1204 is a single point element but may also be linear or a combination of linear and point elements or regions. For example, a "linear" or "serpentine" array of point defects may be fabricated such that it follows an arbitrary three-dimensional path through the PBG, and acts as a tightly constrained waveguide for light propagating within it. The defect would generally be located internally but is shown on the surface for purposes of illustration. The relevant dimensions of this structure are all illustrated in the figure. The diameter and spacing and materials of the PBG are completely application dependent, however the aforementioned design rules and equations also apply.

Three-dimensional PBGs are more complicated to make. Conventional means for fabricating one-dimensional or two-dimensional features, if applied in three dimensions, would involve multiple applications of deposition, pattern, and etch cycles to achieve the third dimension in the structure. Fabrication techniques for building periodic three-dimensional structures include: holographic, where a photosensitive material is exposed to a standing wave and replicates the wave in the form of index variations in the material itself; self-organizing organic or self-assembling materials that rely on innate adhesion and orientation properties of certain co-polymeric materials to create arrays of columnar or spherical structures during the deposition of the material; ceramic approaches that can involve the incorporation of a supply of spherical structures of controlled dimensions into a liquid suspension that, once solidified, organizes the structures, and can be removed by dissolution or high temperature; combinations of these approaches; and others.

Co-polymeric self-assembly techniques are especially interesting because they are both low temperature and require minimal or no photolithography. In general, this technique involves the dissolution of a polymer, polyphenylquinoine-block-polystyrene (PPQmPSn) is one example, into a solvent such as carbon disulfide. After spreading the solution onto a substrate and allowing the solvent to evaporate, a close packed hexagonal arrangement of air filled polymeric spheres results. The process can be repeated multiple times to produce multi-layers, the period of the array may be controlled by manipulating the number of repeat units of the components (m and n) of the polymer. Introduction of a nanometer sized colloid comprising metals, oxides, or semiconductors that can have the effect of reducing the period of the array further, as well as increasing the refractive index of the polymer.

Defects may be introduced via direct manipulation of the material on a submicron scale using such tools as focused ion beams or atomic force microscopes. The former may be used to remove or add material in very small selected areas or to alter the optical properties of the material. Material removal occurs when the energetic particle beam, such as that used by a Focused Ion Beam tool, sputters away material in its path. Material addition occurs when the focused ion beam is passed through a volatile metal containing gas such as tungsten hexafluoride (for tungsten conductor) or silicon tetrafluoride (for insulating silicon dioxide). The gas breaks down, and the constituents are deposited where the beam contacts the substrate. Atomic force microscopy may be used to move materials around on the molecular scale.

Another approach involves the use of a technique that can be called micro-electrodeposition and which is described in detail in U.S. Pat. No. 5,641,391. In this approach a single microscopic electrode can be used to define three-dimensional features of submicron resolution using a variety of materials and substrates. Metal "defects" deposited in this way could be subsequently oxidized to form an dielectric defect around which the PBG array could be fabricated using the techniques described above.

The existence of surface features, in the form of patterns of other materials, on the substrate upon which the PBG is fabricated may also serve as a template for the generation of defects within the PBG during its formation. This is particularly relevant to PBG processes that are sensitive to substrate conditions, primarily self-assembly approaches. These features may encourage or inhibit the "growth" of the PBG in a highly localized region around the seed depending on the specific nature of the process. In this way, a pattern of defect "seeds" may be produced and the PBG formed afterwards with the defects created within during the PBG formation process.

Thus, the class of devices known as IMods may be further broadened by incorporating the larger family of multidimensional photonic structures into the modulator itself. Any kind of photonic structure, which is inherently a static device, may now be made dynamic by altering its geometry and/or altering its proximity to other structures. Similarly, the micromechanical Fabry-Perot filter (shown in FIG. 16), comprising two mirrors which are each one-dimensional photonic structures, may be tuned by altering the cavity width electrostatically.

Figure 13A:
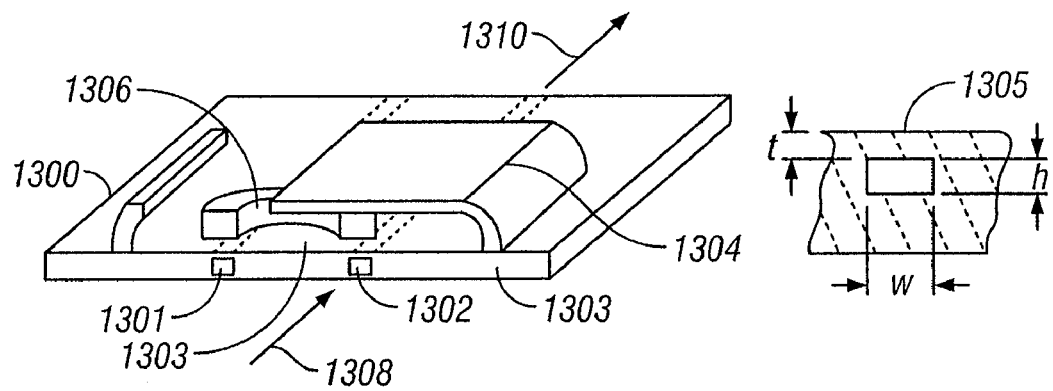
FIG. 13A is a drawing illustrating an IMod incorporating a microring structure in the un-actuated state.

FIG. 13 shows two examples of IMod designs incorporating two-dimensional PBGs. In FIG. 13A, a cutaway diagram reveals a self-supporting membrane 1304, which has been fabricated with a microring resonator 1306 mounted on the side facing the substrate. Waveguides 1301 and 1302 lying within the bulk of the substrate 1303 are planar and parallel and can be fabricated using known techniques. In FIG. 13A, the IMod is shown in the un-driven state with a finite airgap (number) between the microring and the substrate. The microring is fabricated so that its position overlaps and aligns with the paired waveguides in the substrate below. Dimensions of the microring are identical to the example described above. Crossection 1305 shows the dimensions of the waveguides which could be w=1 µm, h=0.5 µm, and t=100 nm. In the un-driven state, light 1308, propagates undisturbed in waveguide 1302, and the output beam 1310 is spectrally identical to the input 1308.

Figure 13B:
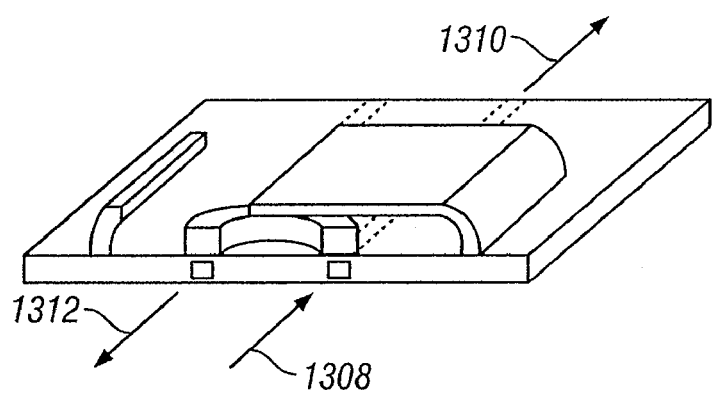
FIG. 13B is the same IMod in the actuated state.

Driving the IMod to force the microring into intimate contact with the substrate and waveguides alters the optical behavior of the device. Light propagating in waveguide 1302 may now couple into the microring by the phenomenon of evanescence. The microring, if sized appropriately, acts as an optical resonator coupling a selected frequency from waveguide 1302 and injecting it into waveguide 1301. This is shown in FIG. 13B where light beam 1312 is shown propagating in a direction opposite the direction of light 1308. Such a device may be used as a frequency selective switch that picks particular wavelengths out of a waveguide by the application of a voltage or other driving means required to bring the structure into intimate contact with the underlying waveguides. A static version of this geometry is described in the paper B.E. Little, et al, "Vertically Coupled Microring Resonator Channel Dropping Filter", IEEE Photonics Technology Letters, vol. 11, no. 2, 1999.

Figure 13C:
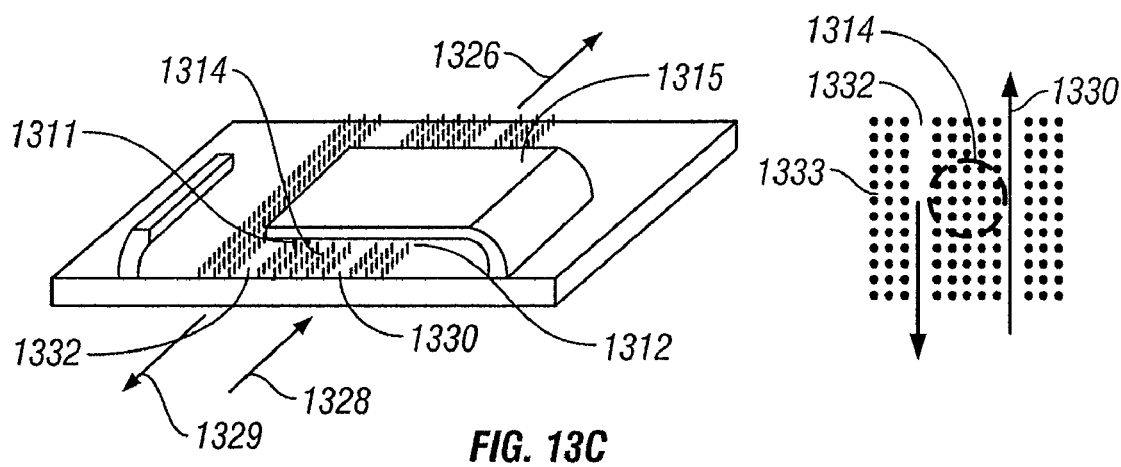
FIG. 13C shows an IMod incorporating periodic 2-D photonic structure.

Another example is illustrated in FIG. 13C. In this case, a pair of waveguides 1332 and 1330 and resonator 1314 are fabricated on the substrate in the form of a columnar PBG. The PBG is a uniform array of columns, with the waveguides defined by removing two rows (one for each waveguide), and the resonator defined by removing two columns. Top view 1333 provides more detail of the construction of waveguides 1330 and 1332, and the resonator 1314. Dimensions are dependent on the wavelength of interest as well as materials used. For a wavelength of 1.55 µm, the diameter and spacing of the columns could be on the order of 0.5 µm and 1 µm respectively. The height, h, determines the propagation modes which will be supported and should be slightly more than half the wavelength if only single modes are to be propagated.

On the inner surface of the membrane 1315 are fabricated two isolated columns 1311, which are directed downwards, and have the same dimensions and are of the same material (or optically equivalent) as the columns on the substrate. The resonator and columns are designed to complement each other; there is a corresponding absence of a column in the resonator where the column on the membrane is positioned.

When the IMod is in an undriven state, there is a finite vertical airgap 1312, of at least several hundred nanometers between the PBG and the membrane columns and therefore no optical interaction occurs. The absence of columns in the resonator act like defects, causing coupling between waveguides 1330 and 1332. In this state the device acts as does the one shown in FIG. 13B and selected frequencies of light propagating along waveguide are now injected into waveguide 1332, and propagate in the opposite direction in the form of light 1329.

Driving the IMod into contact with the PBG, however, places the columns into the resonator altering its behavior. The defects of the resonator are eliminated by the placement of the membrane columns. The device in this state acts as does the one shown in FIG. 13A, with light 1328 propagating without interference.

A static version of this geometry is described in the paper H.A. Haus "Channel drop filters in photonic crystals", Optics Express, vol. 3, no. 1, 1998.

Optical Switches

Figure 14A:
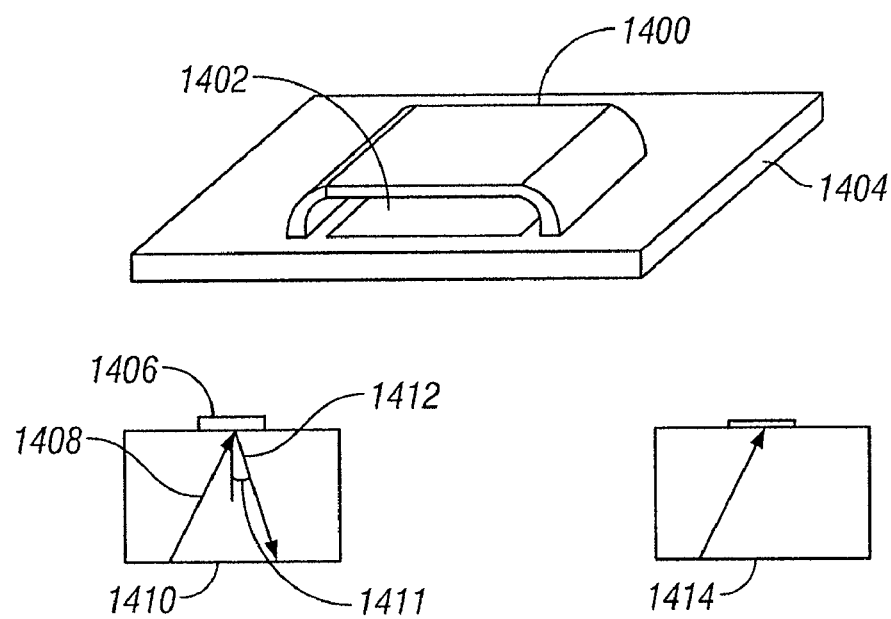
FIG. 14A illustrates and IMod design which acts as an optical switch.

In FIG. 14A, a device based on the induced absorber includes a self-supporting aluminum membrane 1400, on the order of tens to hundreds of microns square, which is suspended over a stack of materials 1402 comprising a combination of metals and oxides and patterned on transparent substrate. The films utilized in the induced absorber modulator, described in U.S. patent application Ser. No. 08/688,710, filed on Jul. 31, 1996, and incorporated by reference, could serve this purpose. The films on the substrate may also comprise a transparent conductor, such as ITG. The structure may incorporate on its underside a glossy metal film such as molybdenum or tungsten, of several hundred angstroms in thickness.

The materials are configured so that in the undriven state the device reflects in a particular wavelength region, but becomes very absorbing when the membrane is driven into contact. Side view 1410 shows a view of the device looking into the side of the substrate. Light beam 1408 propagates at some arbitrary angle through the substrate and is incident on IMod 1406, shown in the un-driven state. Assuming the frequency of the light corresponds with the reflective region of the IMod in the un-driven state, the light is reflected at a complementary angle and propagates away. Side view, 1414, shows the same IMod in the driven state. Because the device is now very absorbing, the light which is incident upon it is no longer reflected but absorbed by the materials in the IMod's stack.

Thus, in this configuration, the IMod may act as an optical switch for light that is propagating within the substrate upon which it is fabricated. The substrate is machined to form surfaces that are highly polished, highly parallel (to within ⅒ of a wavelength of the light of interest), and many times thicker (at least hundreds of microns) than the wavelength of light. This allows the substrate to act as a substrate/waveguide in that light beams propagate in a direction which is, on average, parallel to the substrate but undergo multiple reflections from one surface to another. Light waves in such a structure are often referred to as substrate guided waves.

Figure 14B:
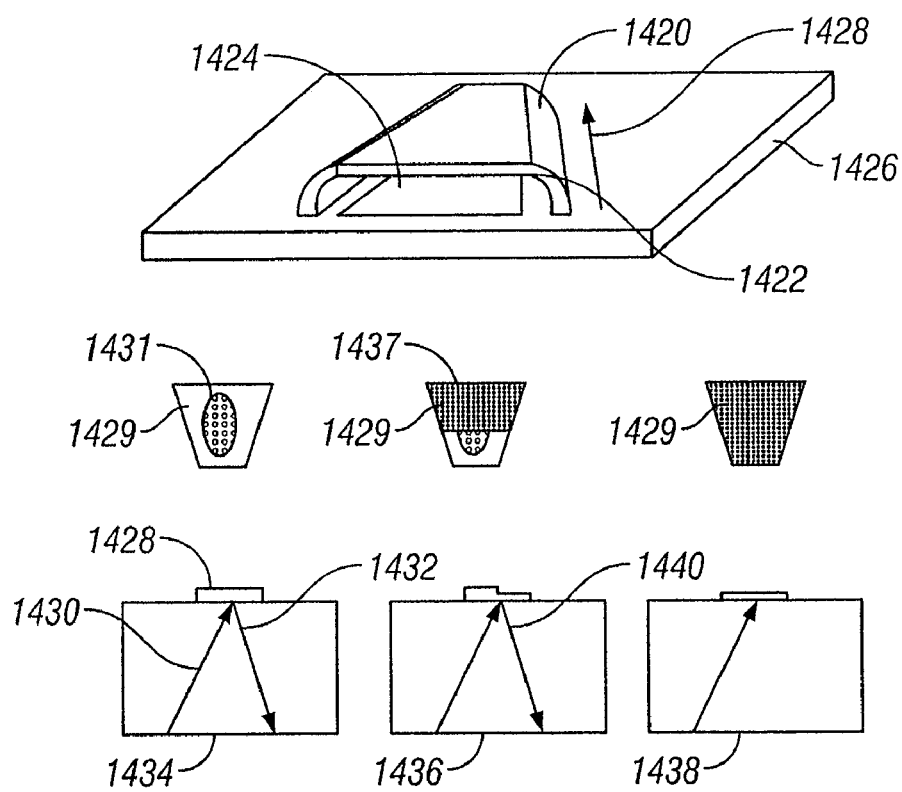
FIG. 14B shows a variation of this design that acts as an optical attenuator.

FIG. 14B shows a variation on this theme. Membrane 1420 is patterned such that it is no longer rectangular but is tapered towards one end. While the mechanical spring constant of the structure remains constant along this length, electrode area decreases. Thus the amount of force which can be applied electrostatically is lower at the narrower end of the taper. If a gradually increasing voltage is applied, the membrane will begin to actuate at the wider end first and actuation will progress along arrow 1428 as the voltage increases.

To incident light, the IMod operates as an absorbing region whose area depends on the value of the applied voltage. Side view 1434 shows the effect on a substrate propagating beam when no voltage is applied. The corresponding reflective area 1429, which shows the IMod from the perspective of the incident beam, shows "footprint" 1431 of the beam superimposed on the reflective area. Since the entire area 1429 is non-absorbing, beam, 1430, is reflected from IMod 1428 (with minimal losses) in the form of beam 1432.

In side view 1436, an interim voltage value is applied and the reflected beam 1440 has been attenuated to some extent because the reflective area, shown in 1437 is now partially absorbing. Views 1438 and 1429 reveal the result of full actuation and the complete attenuation of the beam.

Thus, by using a tapered geometry a variable optical attenuator may be created, the response of which is directly related to the value of the applied voltage.

Figure 15A:
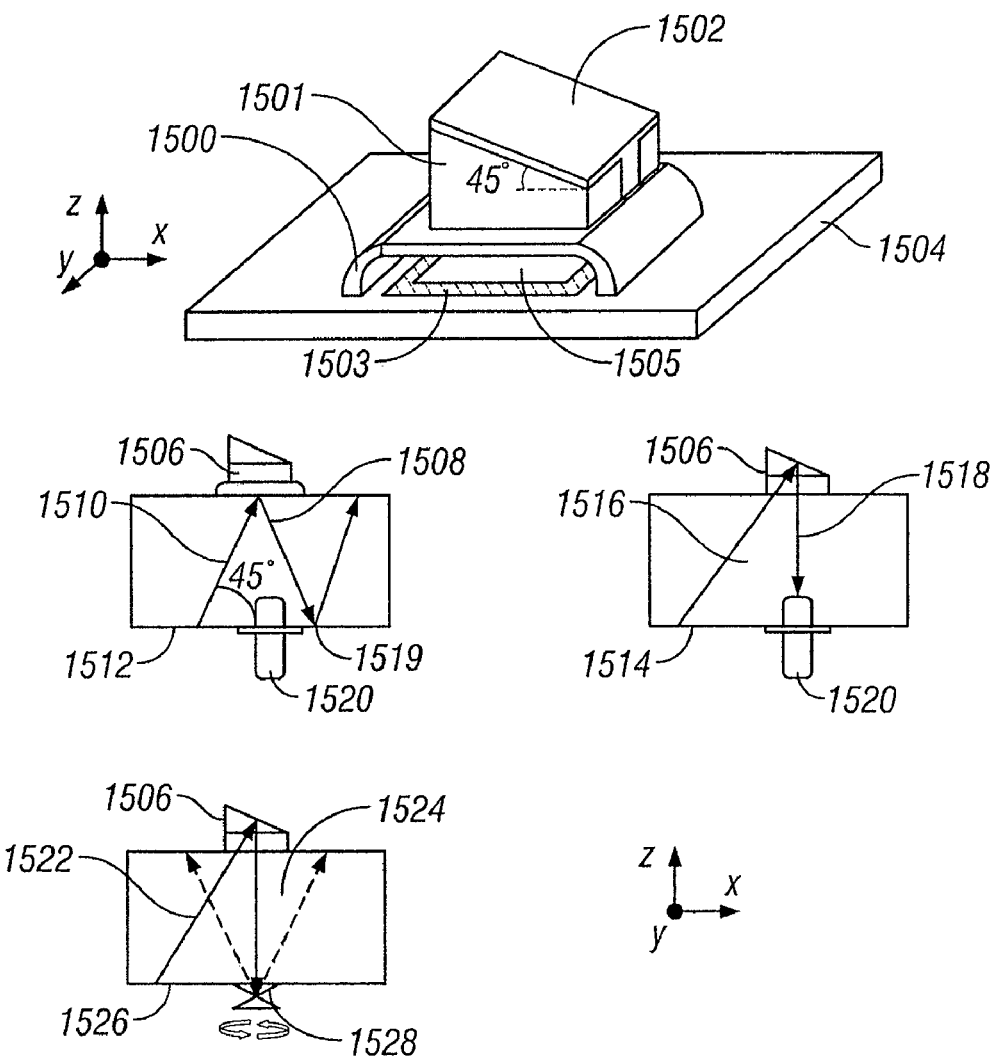
FIG. 15A is a diagram of an IMod design that functions as an optical switch or optical decoupler.
Figure 15B:
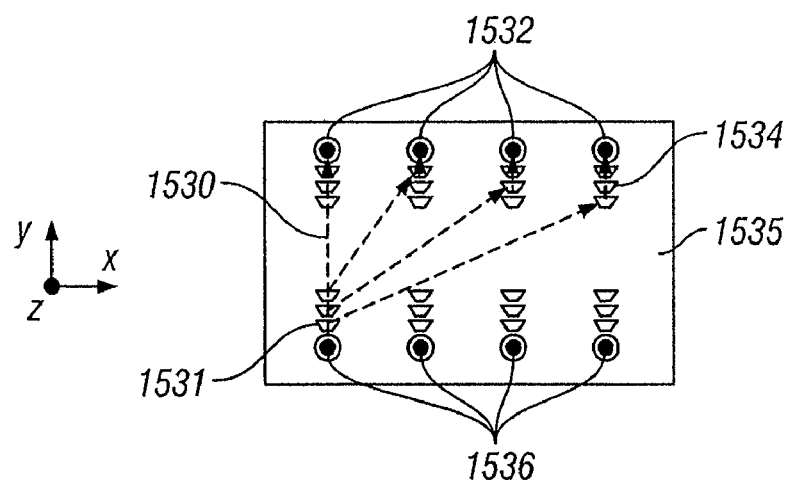
FIG. 15B illustrates how combinations of these IMods can act as a NXN optical switch.

Another kind of optical switch is illustrated in FIG. 15A. Support frame 1500 is fabricated from a metal, such as aluminum several thousand angstroms in thickness, in such a way that it is electrically connected to mirror 1502. Mirror 1502 resides on transparent optical standoff 1501, which is bonded to support 1500. Mirror 1502 may comprise a single metal film or combinations of metals, oxides, and semiconducting films.

The standoff is fabricated from a material that has the same or higher index of refraction than that of the substrate. This could be SiO2 (same index) or a polymer whose index can be varied. The standoff is machined so that the mirror is supported at an angle of 45 degrees. Machining of the standoff can be accomplished using a technique known as analog lithography that relies on a photomask whose features are continuously variable in terms of their optical density. By appropriate variation of this density on a particular feature, three-dimensional shapes can be formed in photoresist that is exposed using this mask. The shape can then be transferred into other materials via reactive ion etching. The entire assembly is suspended over conductor, 1503, which has been patterned to provide an unobstructed "window" 1505 into the underlying substrate, 1504. That is to say the bulk of conductor 1503 has been etched away so that window 1505, comprising bare glass, is exposed. The switch, like other IMods, can be actuated to drive the whole assembly into contact with the substrate/waveguide. Side view, 1512, shows the optical behavior. Beam 1510 is propagating within the substrate at an angle 45 degrees from normal that prevents it from propagating beyond the boundaries of the substrate. This is because 45 degrees is above the angle known as the critical angle, which allows the beam to be reflected with minimal or no losses at the interface 1519 between the substrate and the outside medium by the principle of total internal reflection (TIR).

The principle of TIR depends on Snell's law, but a basic requirement is that the medium outside the substrate have an index of refraction that is lower than that of the substrate. In side view, 1512, the device is shown with the switch 1506 in the un-driven state, and beam 1510 propagating in an unimpeded fashion. When switch 1506 is actuated into contact with the substrate as shown in side view 1514, the beam's path is altered. Because the standoff has a refractive index greater than or equal to that of the substrate, the beam no longer undergoes TIR at the interface. The beam propagates out of the substrate into the optical standoff, where it is reflected by the mirror. The mirror is angled, at 45 degrees, such that the reflected beam is now traveling at an angle which is normal to the plane of the substrate. The result is that the light may propagate through the substrate interface because it no longer meets the criteria for TIR, and can be captured by a fiber coupler 1520, which has been mounted on the opposite side of the substrate/waveguide. A similar concept is described in the paper, X. Zhou, et al, "Waveguide Panel Display Using Electromechanical Spatial Modulators", SID Digest, vol. XXIX, 1998. This particular device was designed for emissive display applications. The mirror may also be implemented in the form of a reflecting grating, which may be etched into the surface of the standoff using conventional patterning techniques. This approach, however, exhibits wavelength dependence and losses due to multiple diffraction orders that are not an issue with thin film mirrors. Additionally, alternative optical structures may be substituted for the mirror as well with their respective attributes and shortcomings. These can be categorized as refractive, reflective, and diffractive and can include microlenses (both transmissive and reflective), concave or convex mirrors, diffractive optical elements, holographic optical elements, prisms, and any other form of optical element which can be created using micro-fabrication techniques. In the case where an alternative optical element is used, the standoff and the angle it imparts to the optic may not be necessary depending on the nature of the micro-optic.

This variation on the IMod acts as a de-coupling switch for light. Broadband radiation, or specific frequencies if the mirror is designed correctly, can be coupled out of the substrate/waveguide at will. Side view 1526 shows a more elaborate implementation in which an additional fixed mirror, angled at 45 degrees, has been fabricated on the side of the substrate opposite that of the de-coupling switch. This mirror differs from the switch in that it cannot be actuated. By careful selection of the angles of the mirrors on both structures, light 1522 that has been effectively decoupled out of the substrate by switch 1506 may be re-coupled back into the substrate by re-coupling mirror 1528. However, by fabricating the re-coupling mirror with different orientations in the XY plane, the mirror combination may be used to redirect light in any new direction within the substrate/waveguide. The combination of these two structures will be referred to as a directional switch. Re-coupling mirrors can also be used to couple any light that is propagating into the substrate in a direction normal to the surface.

FIG. 15H shows one implementation of an array of directional switches. Looking down onto the substrate 1535, linear array 1536 is an array of fiber couplers which directs light into the substrate at an angle normal to the XY plane. An array of re-coupling mirrors (not visible) is positioned directly opposite the fiber coupler array to couple light into the substrate parallel to beam 1530. On the surfaces of the substrate, 1535, are fabricated an array of directional switches of which 1531 is one. The switches are positioned in a way such that light coupled into the substrate from anyone of the input fiber couplers 1536 may be directed to anyone of the output fiber couplers 1532. In this way the device may act as an N X N optical switch that can switch anyone of any number of different inputs to any one of any number of different outputs.

Tunable Filter

Returning to FIG. 16, an IMod in the form of a tunable Fabry-Perot filter is shown. In this case, conducting contact pad 1602 has been deposited and patterned along with dielectric mirrors 1604 and 1608 and sacrificial layer 1606. This may consist of a silicon film with a thickness of some multiple of one-half a wavelength. The mirrors may comprise stacks of materials, TiO2 (high index) and SiO2 (low index) being two examples, with alternating high and low indices, and one of the layers may also be air. Insulating layer 1610 is deposited and patterned such that second contact pad 1612 only contacts mirror 1608. Mirror, 1608 is subsequently patterned leaving a mirror "island" 1614 connected by supports 1615. The lateral dimensions of the island are primarily determined by the size of light beam with which it will interact. This is usually on the order of tens to several hundred microns. Sacrificial layer 1606 is partially etched chemically, but leaving standoffs of sufficient size to provide mechanical stability, probably on the order of tens of microns square. If the top layer of mirror 1608 and the bottom layer of mirror 1604 are lightly doped to be conducting, then application of a voltage between contact pads 1602 and 1612 will cause the mirror island to be displaced. Thus, the structure's optical response may be tuned.

Figure 17A:
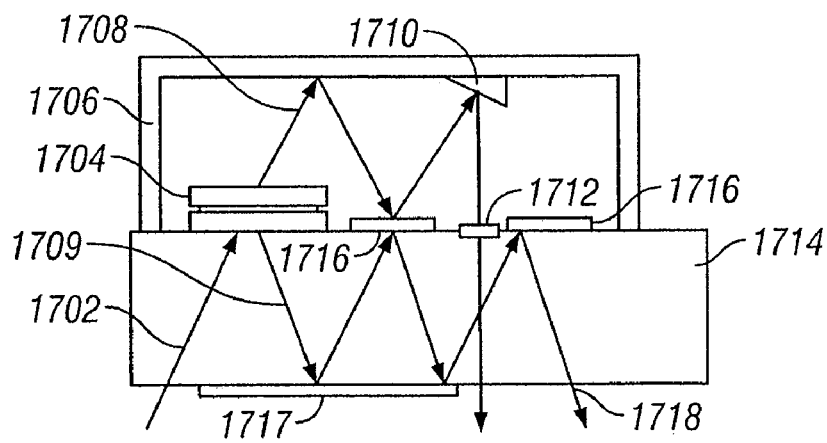
FIG. 17A illustrates how the tunable IMod structure can be incorporated into a wavelength selective switch.

FIG. 17A shows an application of this tunable filter. On the top surface of substrate 1714 has been fabricated tunable filter 1704, mirrors 1716, and anti-reflection coating 1712. A mirror 1717 has also been fabricated on the bottom surface of the substrate, e.g., from a metal such as gold of at least 100 nm thick. Mounted on the top surface of the substrate is an optical superstructure, 1706, whose inner surface is at least 95% reflective, e.g., by the addition of a reflecting gold film, and which also supports an angled mirror, 1710. In this device, light beam 1702 propagates within the substrate at some angle that is larger than the critical angle, which is approximately 41 degrees for a substrate of glass and a medium of air. Therefore the mirrors 1716 are required to keep it bounded within the confines of the substrate/waveguide. This configuration allows greater flexibility in the selection of angles at which the light propagates.

Beam 1702 is incident upon Fabry-Perot 1704, which transmits a particular frequency of light 1708 while reflecting the rest 1709. The transmitted frequency is incident onto and reflected from the reflective superstructure 1706, and is reflected again by mirror 1716 onto angled mirror 1710. Mirror 1710 is tilted such that the light is directed towards antireflection coating 1712 at a normal angle with respect to the substrate, and passes through and into the external medium. The device as a whole thus acts as a wavelength selective filter.

The superstructure may be fabricated using a number of techniques. One would include the bulk micromachining of a slab of silicon to form a cavity of precise depth, e.g., on the order of the thickness of the substrate and at least several hundred microns. The angled mirror is fabricated after cavity etch, and the entire assembly is bonded to the substrate, glass for example, using any one of many silicon/glass bonding techniques.

Figure 17B:
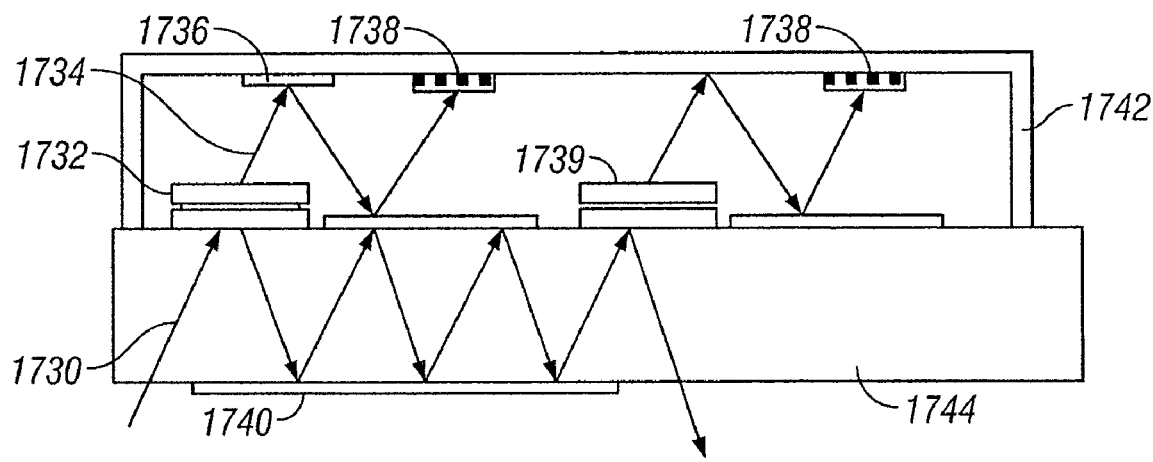
FIG. 17B further illustrates how the wavelength selective switch may incorporate solid state devices.

FIG. 17B is a more elaborate version. In this example, a second tunable filter 1739 has been added to provide an additional frequency selection channel. That is to say that two separate frequencies may now be selected independently. Detectors 1738 have also been added to allow for a higher degree of integrated functionality.

Figure 17C:
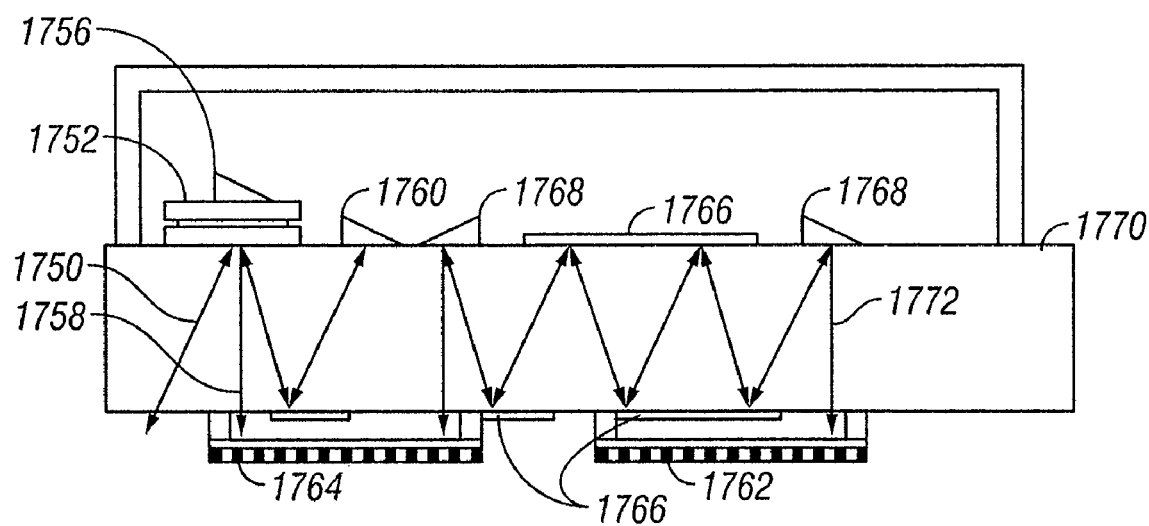
FIG. 17C illustrates how bump-bonded components may be integrated.

FIG. 17C incorporates integrated circuits. Light beam 1750 has been coupled into substrate 1770 and is incident upon tunable filter 1752. This filter is different than those of FIGS. 17A and 17B in that it includes recoupling mirror 1756 that has been fabricated on the surface of the movable mirror of the filter. The angle of the mirror is such that the frequency selected by filter 1752 is now coupled directly back into the substrate at a normal angle in the form of light beam 1758. The remaining frequencies contained in light beam 1750 propagate until they encounter recoupling mirror 1760 which is angled so that it presents a surface which is perpendicular to propagating beam 1756. The beam thus retraces its path back out of the device where it may be used by other devices that are connected optically. Light beam 1758 is incident on IC 1764 that can detect and decode the information within this beam. This IC may be in the form of an FPGA or other silicon, silicon/germanium, or gallium arsenide device based integrated circuit that could benefit from being directly coupled to information carrying light. For example, a high bandwidth optical interconnect may be formed between ICs 1764 and 1762 by virtue of the bi-directional light path 1772. This is formed by a combination of mirrors 1766 and recoupling mirrors 1768. Light can be emmitted by either ICs if they incorporate components such as vertical cavity surface emitting lasers (VCSELS) or light emitting diodes LEDs. Light can be detected by any number of optically sensitive components, with the nature of the component depending on the semiconductor technology used to fabricate the IC. Light that is incident on the IC may also be modulated by IMods that have been fabricated on the surface of the IC that is exposed to the substrate propagating light.

Optical Mixer Using Substrate Waveguide

Figure 18A:
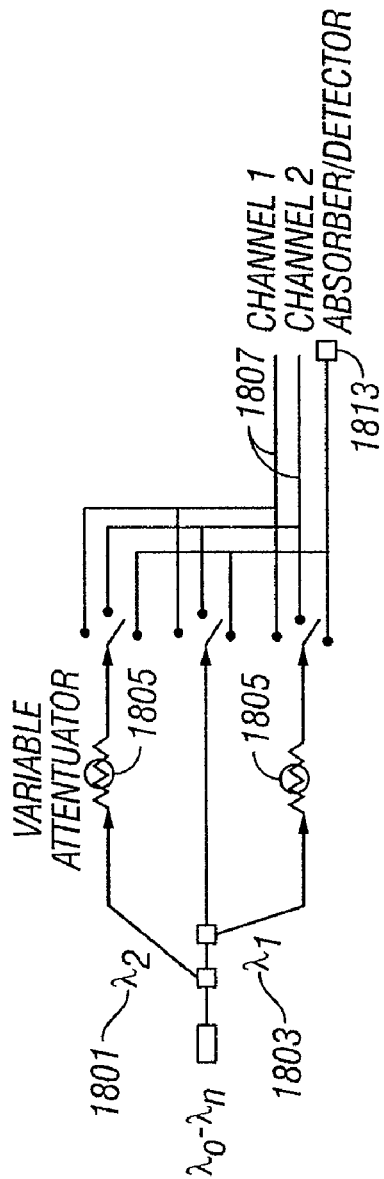
FIG. 18A is a schematic representation of a two-channel equalizer/mixer.
Figure 18B:
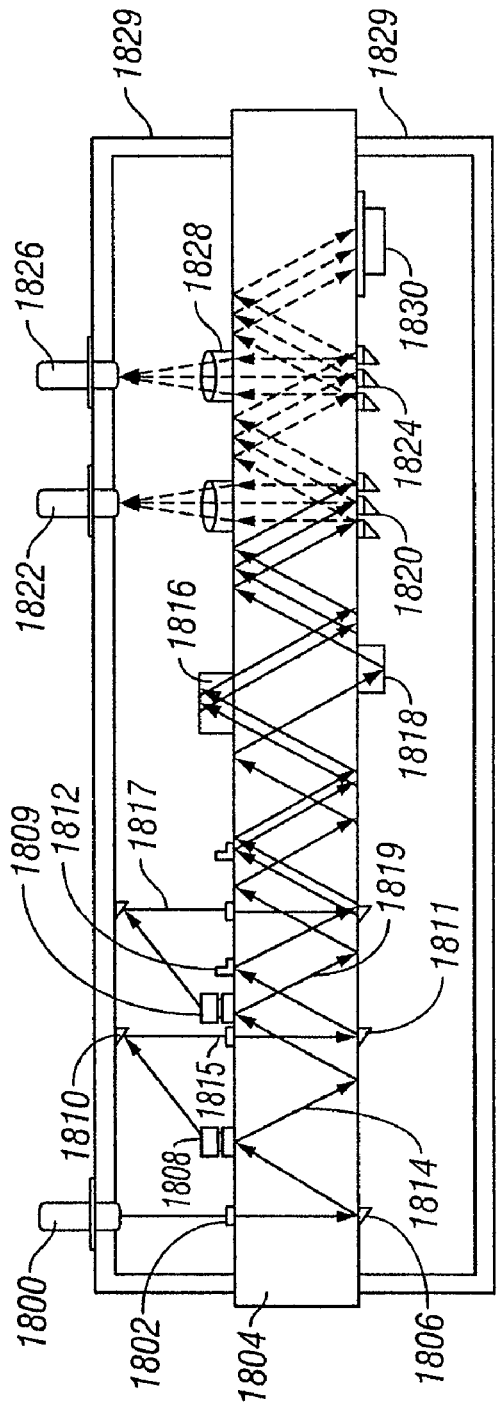
FIG. 18B illustrates how the equalizer/mixer may be implemented using IMod based components.

FIGS. 18A and 18B are an illustration of a two-channel optical mixer implemented using a TIR version of a substrate/waveguide. FIG. 18A shows a schematic of the device. Light containing multiple wavelengths has two particular wavelengths, 1801 and 1803, split off and directed towards two independent variable attenuators 1805. They are then output to several possible channels 1807 or into an optical stop 1813.

FIG. 18B reveals an implementation. The input light is directed into the device through fiber coupler 1800, through anti-reflection coating 1802, and coupled into the substrate using re-coupling mirror 1806. The recoupling mirror directs the light onto tunable filter 1808, splitting off frequency A1 (beam 1815) and all non-selected frequencies are directed toward a second tunable filter 1809, which splits off frequency A2 (beam 1817), with the remaining frequencies, beam 1819, propagating further downstream via TIR. Following the path of beam 1815, which was transmitted by tunable filter 1808, the light is redirected back into the substrate waveguide via mirror 1810, through an AR coating, and re-coupled back into the substrate. The re-coupling mirror 1811 directs beam 1815 towards attenuator 1812 where it continues along a parallel path with beam 1817 selected by the second tunable filter 1809. These two beams are positionally shifted by virtue of beam repositioner 1816.

This structure produces the same result as a recoupling mirror, except that the mirror is parallel to the surface of the substrate. Because the mirror is suspended a fixed distance beyond the substrate surface, the position of the point of incidence on the opposite substrate interface is shifted towards the right. This shift is directly determined by the height of the repositioner. The beam 1819, containing the unselected wavelengths, is also shifted by virtue of repositioner 1818. The result is that all three beams are equally separated when they are incident on an array of decoupling switches 1820 and 1824. These serve selectively to redirect the beams into one of two optical combiners, 1828 being one of them or into detector/absorber 1830. The optical combiners may be fabricated using a variety of techniques. A polymeric film patterned into the form of a pillar with its top formed into a lens using reactive ion etching is one approach. The absorber/detector, comprising a semiconductor device that has been bonded to the substrate, serves to allow the measurement of the output power of the mixer. Optical superstructures 1829 support external optical components and provide a hermetic package for the mixer.

The combination of planar IMods and a substrate waveguide provide a family of optical devices that are easily fabricated, configured, and coupled to the outside world because the devices reside on the waveguide and/or on the superstructure and are capable of operating on light which is propagating within the waveguide, and between the waveguide and the superstructure. Because all of the components are fabricated in a planar fashion, economies of scale can be achieved by bulk fabrication over large areas, and the different pieces maybe aligned and bonded easily and precisely. In addition, because all of the active components exhibit actuation in a direction normal to the substrate, they are relatively simple to fabricate and drive, compared to more elaborate non-planar mirrors and beams. Active electronic components may be bonded to either the superstructure or the substrate/waveguide to increase functionality. Alternatively, active devices may be fabricated as a part of the superstructure, particularly if it is a semiconductor such as silicon or gallium arsenide.

Printing Style Fabrication Processes

Because they are planar and because many of the layers do not require semiconducting electrical characteristics that require specialized substrates, IMods, as well as many other MEM structures, may take advantage of manufacturing techniques which are akin to those of the printing industry. These kinds of processes typically involve a "substrate" which is flexible and in the form of a continuous sheet of say paper or plastic. Referred to as web fed processes, they usually involve a continuous roll of the substrate material which is fed into a series of tools, each of which selectively coats the substrate with ink in order to sequentially build up a full color graphical image. Such processes are of interest due to the high speeds with which product can be produced.

Figure 19:
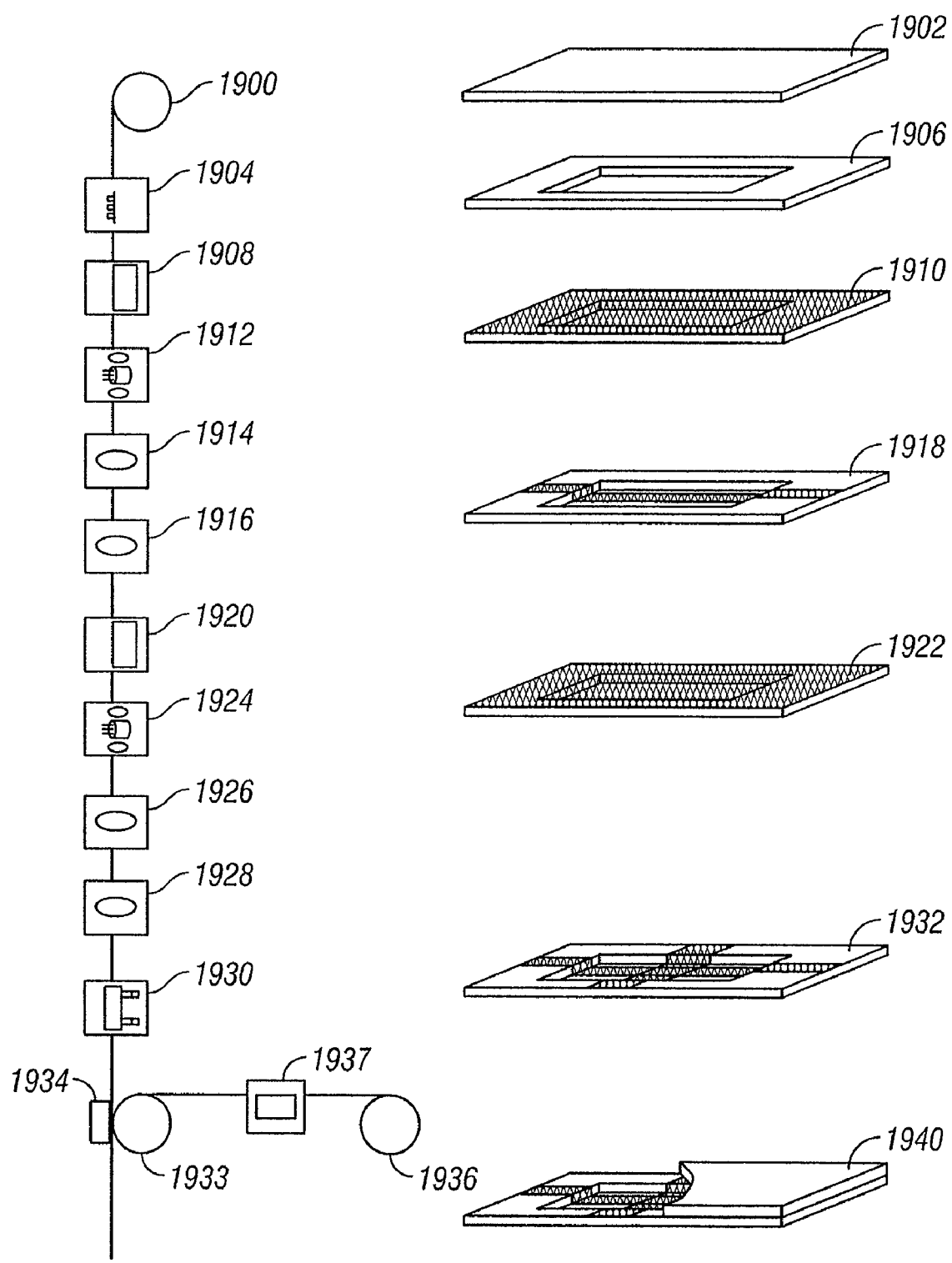
FIG. 19 is a diagram illustrating a continuous web-based fabrication process.

FIG. 19 is a representation of such a sequence applied to the fabrication of a single IMod and, by extension, to the fabrication of arrays of IMods or other microelectromechanical structures. Web source 1900 is a roll of the substrate material such as transparent plastic. A representative area 1902 on a section of material from the roll contains, for the purposes of this description, only a single device. Embossing tool 1904 impresses a pattern of depressions into the plastic sheet. This can be accomplished by a metal master which has the appropriate pattern of protrusions etched on it.

The metal master is mounted on a drum that is pressed against the sheet with enough pressure to deform the plastic to form the depressions. View 1906 illustrates this. Coater 1908 deposits thin layers of material using well known thin film deposition processes, such as sputtering or evaporation. The result is a stack 1910 of four films comprising an oxide, a metal, an oxide, and a sacrificial film. These materials correspond to the induced absorber IMod design. A tool 1912 dispenses, cures, and exposes photoresist for patterning these layers. Once the pattern has been defined, the film etching occurs in tool 1914. Alternatively, patterning may be accomplished using a process known as laser ablation. In this case, a laser is scanned over the material in a manner that allows it to be synchronized with the moving substrate. The frequency and power of the laser is such that it can evaporate the materials of interest to feature sizes that are on the order of microns. The frequency of the laser is tuned so that it only interacts with the materials on the substrate and not the substrate itself. Because the evaporation occurs so quickly, the substrate is heated only minimally.

In this device example, all of the films are etched using the same pattern. This is seen in 1918 where the photoresist has been stripped away after the application of tool 1916. Tool 1920, is another deposition tool that deposits what will become the structural layer of the IMod. Aluminum is one candidate for this layer 1922. This material may also include organic materials which exhibit minimal residual stress and which may be deposited using a variety of PVD and PECVD techniques. This layer is subsequently patterned, etched, and stripped of photoresist using tools 1924, 1926, and 1928 respectively. Tool 1930 is used to etch away the sacrificial layer. If the layer is silicon, this can be accomplished using XeF2, a gas phase etchant used for such purposes. The result is the self-supporting membrane structure 1932 that forms the IMod.

Packaging of the resulting devices is accomplished by bonding flexible sheet 1933 to the top surface of the substrate sheet. This is also supplied by a continuous roll 1936 that has been coated with a hermetic film, such as a metal, using coating tool 1934. The two sheets are joined using bonding tool 1937, to produce the resulting packaged device 1940.

Stress Measurement

Residual stress is a factor in the design and fabrication of MEM structures. In IMods, and other structures in which structural members have been mechanically released during the fabrication process, the residual stress determines the resulting geometry of the member.

The IMod, as an interferometric device, is sensitive to variations in the resulting geometry of the movable membrane. The reflected, or in other design cases transmitted, color is a direct function of the airgap spacing of the cavity. Consequently, variations in this distance along the length of a cavity can result in unacceptable variations in color. On the other hand, this property is a useful tool in determining the residual stress of the structure itself, because the variations in the color can be used to determine the variations and degree of deformation in the membrane. Knowing the deformed state of any material allows for a determination of the residual stresses in the material. Computer modeling programs and algorithms can use two-dimensional data on the deformation state to determine this. Thus the IMod structure can provide a tool for making this assessment.

FIGS. 20A-20G show examples of how an IMod may be used in this fashion. Referring to FIGS. 20A and 20B, IMods 2000, and 2002, are shown from the perspective of the side and the bottom (i.e. viewed through the substrate). They are of a double cantilever and single cantilever form respectively. In this case, the structural material has no residual stresses, and both membranes exhibit no deformation. As viewed through the substrate, the devices exhibit a uniform color that is determined by the thickness of the spacer layer upon which they were formed. Referring to FIGS. 20C and 20D, IMods 2004 and 2006 are shown with a stress gradient that is more compressive on the top than it is on the bottom. The structural membranes exhibit a deformation as a result, and the bottom view reveals the nature of the color change that would result. For example if color region 2016 were green, then color region 2014 might be blue because it is closer to the substrate. Conversely, color region 2018 (shown on the double cantilever) might be red because it is farther away. Referring to FIGS. 20E and 20F, IMods 2008 and 2010 are shown in a state where the stress gradient exhibits higher tensile stress on the top than on the bottom. The structural members are deformed appropriately, and the color regions change as a result. In this case, region 2020 is red, while region 2022 is blue.

In FIG. 20G, a system is shown which can be used to quickly and accurately assess the residual stress state of a deposited film. Wafer 2030 comprises an array of IMod structures consisting of both single and double cantilevered membranes with varying lengths and widths. The structural membranes are fabricated from a material whose mechanical and residual stress properties are well characterized. Many materials are possible, subject to the limitations of the requisite reflectivity that can be quite low given that the IMods in this case are not to be used for display purposes. Good candidates would include materials in crystalline form (silicon, aluminum, germanium) which are or can be made compatible from a fabrication standpoint, exhibit some degree of reflectivity, and whose mechanical properties can or have been characterized to a high degree of accuracy. These "test structures" are fabricated and released so that they are freestanding. If the materials are without stress, then the structures should exhibit no color variations. Should this not be the case, however, then the color states or color maps may be recorded by use of a high resolution imaging device 2034, which can obtain images of high magnification via optical system 2032.

The imaging device is connected to a computer system 2036, upon which resides hardware and capable of recording and processing the image data. The hardware could comprise readily available high speed processing boards to perform numerical calculations at high rates of speed. The software may consist of collection routines to collect color information and calculate surface deformations. The core routine would use the deformation data to determine the optimal combination of uniform stress and stress gradient across the thickness of the membrane, which is capable of producing the overall shape.

One mode of use could be to generate a collection of "virgin" test wafers with detailed records of their non-deposited stress states, to be put away for later use. When the need arises to determine the residual stress of a deposited film, a test wafer is selected and the film is deposited on top of it. The deposited film alters the geometry of the structures and consequently their color maps. Using software resident on the computer system, the color maps of the test wafer both before and after may be compared and an accurate assessment of the residual stress in the deposited film made. The test structures may also be designed to be actuated after deposition. Observation of their behavior during actuation with the newly deposited films can provide even more information about the residual stress states as well as the change in the film properties over many actuation cycles.

This technique may also be used to determine the stress of films as they are being deposited. With appropriate modification of the deposition system, an optical path may be created allowing the imaging system to view the structures and track the change of their color maps in real time. This would facilitate real-time feedback systems for controlling deposition parameters in an attempt to control residual stress in this manner. The software and hardware may "interrogate" the test wafer on a periodic basis and allow the deposition tool operator to alter conditions as the film grows. Overall this system is superior to other techniques for measuring residual stress, which either rely on electromechanical actuation alone, or utilize expensive and complex interferometric systems to measure the deformation of fabricated structures. The former suffers from a need to provide drive electronics to a large array of devices, and inaccuracies in measuring displacement electronically. The latter is subject to the optical properties of the films under observation, and the complexity of the required external optics and hardware.

Discontinuous Films

Another class of materials with interesting properties are films whose structure is not homogeneous. These films can occur in several forms and we shall refer to them collectively as discontinuous films. FIG. 21A illustrates one form of the discontinuous film. Substrate 2100 could be a metal, dielectric, or semiconductor, which has had contours 2104, 2106, and 2108 etched into its surface. The contours, comprising individual structural profiles which should have a height 2110 that is some fraction of the wavelength of light of interest, are etched using photolithographic and chemical etching techniques to achieve profiles which are similar to those illustrated by, 2104 (triangular), 2106, (cylindrical) and 2108 (klopfenstein taper). The effective diameter of the base 2102 of any of the individual profiles is also on the order of the height of the pattern. While each contour is slightly different, they all share in common the property that as one traverses from the incident into the substrate, the effective index of refraction goes gradually from that of the incident medium, to that of the film substrate 2100 itself. Structures of this type act as superior antireflection coatings, compared to those made from combinations of thin films, because they do not suffer as much from angular dependencies. Thus, they remain highly antireflective from a broader range of incident angles.

FIGS. 21B and 21C reveal a coating 2120 that has been deposited on substrate 2122 and could also be of a metal, dielectric, or semiconductor. FIG. 21B depicts a side view of the coating and substrate, and FIG. 21C depicts a top view of the coating and substrate. The film, in this case, is still in the early stages of formation, somewhere below 1000 angstroms in thickness. During most deposition processes, films undergo a gradual nucleation process, forming material localities that grow larger and larger until they begin to join together and, at some point, form a continuous film. 2124 shows a top view of this film. The optical properties of films in the early stage differ from that of the continuous film. For metals, the film tends to exhibit higher losses than its continuous equivalent.

FIGS. 21D and 21E illustrate a third form of discontinuous film. FIG. 21D depicts a side view of the film, and FIG. 21E depicts a top view of the film. In this case, film 2130 has been deposited on substrate 2132 to a thickness, at least a thousand angstroms, such that it is considered continuous. A pattern of "subwavelength" (i.e. a diameter smaller than the wavelength of interest) holes 2134 is produced in the material using techniques which are similar to the self-assembly approach described earlier. In this case, the polymer can act as a mask for transferring the etch pattern into the underlying material, and the holes etched using reactive ion etch techniques. Because the material is continuous, but perforated, it does not act like the early stage film of FIGS. 21B and 21C. Instead, its optical properties differ from the un-etched film in that incident radiation experiences lower losses and may exhibit transmission peaks based on surface plasmons. Additionally, the geometry of the holes as well as the angle of incidence and refractive index of the incident medium may be manipulated to control the spectral characteristics of the light that is transmitted. 2136 shows a top view of this film. Films such as these are described in the paper "Control of optical transmission through metals perforated with subwavelength hole arrays" by Tae Jin Kim. While they are regular in structure, they differ from PBGs.

All three of these types of discontinuous films are candidates for inclusion into an IMod structure. That is to say they could act as one or more of the material films in the static and/or movable portions of an IMod structure. All three exhibit unique optical properties which can be manipulated in ways that rely primarily on the structure and geometry of the individual film instead of a combination of films with varying thickness. They can be used in conjunction with other electronic, optical, and mechanical elements of an IMod that they could comprise. In very simple cases, the optical properties of each of these films may be changed by bringing them into direct contact or close proximity to other films via surface conduction or optical interference. This can occur by directly altering the conductivity of the film, and/or by altering the effective refractive index of its surrounding medium. Thus more complex optical responses in an individual IMod may be obtained with simpler structures that have less complex fabrication processes.

Other embodiments are within the scope of the following claims.

What is claimed is:

1. A method of making a control circuit for a Micro-Electro-Mechanical System ("MEMS"), the method comprising:
    depositing a silicon layer on a substrate;
    patterning the deposited silicon layer;
    depositing a structural material on the silicon layer;
    patterning the deposited structural material to form a source beam, a drain structure, and a gate structure;
    plating a non-corroding metal on the deposited structural material; and
    etching away at least some of the silicon layer.

2. The method of claim 1, wherein the deposited structural material comprises an aluminum alloy.

3. The method of claim 1, wherein the non-corroding metal comprises at least one of gold, iridium, or platinum.

4. The method of claim 3, wherein the plated non-corroding material is configured to minimize contact resistance in the control circuit.

5. The method of claim 1, wherein the silicon layer comprises a sacrificial material.

6. A device for controlling a Micro-Electro-Mechanical System ("MEMS"), the device comprising:
    a silicon layer deposited over a substrate, wherein the silicon layer is patterned and at least some of the silicon layer is etched away;
    a structural material deposited over the silicon layer, wherein the structural material comprises a source beam, a drain structure, and a gate structure; and
    a non-corroding metal deposited over the structural material, wherein the non-corroding metal is plated.

7. The device of claim 6, wherein the structural material comprises an aluminum alloy.

8. The device of claim 6, wherein the non-corroding metal comprises at least one of gold, iridium or platinum.

9. The device of claim 8, wherein the non-corroding metal is configured to minimize contact resistance.

10. The device of claim 6, further comprising a voltage generator configured to apply a voltage between the source beam and gate structure to deflect the source beam toward the gate structure.

11. The device of claim 8, wherein the source beam is configured to deflect toward the gate structure in a plane parallel to the substrate.

12. The device of claim 8, wherein the source beam is configured to deflect toward the gate structure by a distance that is sufficient to establish electrical contact between the source beam and the drain structure.

13. The device of claim 6, wherein the source beam comprises a switch beam, a contact beam and an insulator material located between the switch beam and the contact beam, and wherein the insulator material is configured to electrically isolate the switch beam from the contact beam.

* * * * *

UNITED STATES PATENT AND TRADEMARK OFFICE
CERTIFICATE OF CORRECTION

PATENT NO.        : 7,355,782 B2
APPLICATION NO.   : 11/564800
DATED             : April 8, 2008
INVENTOR(S)       : Miles It is certified that error appears in the above-identified patent and that said Letters Patent is hereby corrected as shown below:

In Page 2, Col. 2 (Other Publications), Line 21, delete "Offic" and insert -- Office --, therefor.

In Col. 1, Line 16 (Approx.), delete "08/554,630," and insert -- 08/554,630 --, therefor.

In Col. 6, Line 23, delete "Vco11" and insert -- Vcol1 --, therefor.

In Col. 6, Line 26, delete "F1" and insert -- F0 --, therefor.

In Col. 6, Line 27, delete "F1" and insert -- F0 --, therefor.

In Col. 6, Line 27, delete "Vco11" and insert -- Vcol1 --, therefor.

In Col. 6, Line 28, delete "Vco11" and insert -- Vcol1 --, therefor.

In Col. 6, Line 36 (Approx.), delete "F1." and insert -- F0. --, therefor.

In Col. 6, Line 33 (Approx.), delete "Vco11" and insert -- Vcol1 --, therefor.

In Col. 6, Line 38 (Approx.), delete "Vco11" and insert -- Vcol1 --, therefor.

In Col. 6, Line 63, delete ""base +pigment"." and insert -- "base+pigment". --, therefor.

In Col. 10, Line 46, delete "this,ight" and insert -- this, light --, therefor.

In Col. 10, Line 65, delete "path,ight" and insert -- path, light --, therefor.

In Col. 12, Line 48 (Approx.), delete "Vco1," and insert -- Vcol1, --, therefor.

In Col. 12, Line 53 (Approx.), delete "F1," and insert -- F0, --, therefor. (second occurrence)

UNITED STATES PATENT AND TRADEMARK OFFICE
CERTIFICATE OF CORRECTION

PATENT NO. : 7,355,782 B2
APPLICATION NO. : 11/564800
DATED : April 8, 2008
INVENTOR(S) : Miles It is certified that error appears in the above-identified patent and that said Letters Patent is hereby corrected as shown below:

In Col. 28, Line 19, in Claim 11, delete "claim 8," and insert -- claim 10, --, therefor.

In Col. 28, Line 22, in Claim 12, delete "claim 8," and insert -- claim 10, --, therefor.

Signed and Sealed this

Twenty-fourth Day of March, 2009

JOHN DOLL
*Acting Director of the United States Patent and Trademark Office*